United States Patent [19]

Archer

[11] Patent Number: 5,000,085
[45] Date of Patent: Mar. 19, 1991

[54] AIR SLOT COOKING GRILL

[75] Inventor: Virgil L. Archer, Boyce City, Okla.

[73] Assignee: Archer Aire Industries, Inc., Dallas, Tex.

[21] Appl. No.: 219,038

[22] PCT Filed: Dec. 24, 1986

[86] PCT No.: PCT/US86/02801
§ 371 Date: Mar. 7, 1988
§ 102(e) Date: Mar. 7, 1988

[87] PCT Pub. No.: WO88/00681
PCT Pub. Date: Jan. 28, 1988

[51] Int. Cl.[5] .................. F24C 15/14; F24C 15/32
[52] U.S. Cl. ........................ 99/445; 99/474; 99/480; 126/21 A; 219/400
[58] Field of Search ............ 49/444, 445, 447, 450, 49/473, 474, 475, 480, 481; 126/21 A; 219/400

[56] References Cited
U.S. PATENT DOCUMENTS

| Re. 31,765 | 12/1984 | Guibert | 219/400 |
| 850,654 | 4/1907 | Jones | 99/445 |
| 1,504,102 | 8/1924 | Davis | 99/447 X |
| 2,065,895 | 12/1936 | Jandat | 126/21 A |
| 2,214,630 | 9/1940 | Wheeler | 99/447 X |
| 2,985,097 | 5/1961 | Nevin et al. | 99/447 |
| 3,820,525 | 6/1974 | Pond | 126/21 A |
| 3,839,622 | 10/1974 | Mastin . | |
| 3,884,213 | 5/1975 | Smith | 99/473 X |
| 4,438,572 | 3/1984 | Kaminski | 99/447 X |
| 4,455,478 | 6/1984 | Guibert | 219/400 |
| 4,506,652 | 3/1985 | Baker et al. | 126/21 A |
| 4,569,658 | 2/1986 | Wiggins et al. | 99/474 X |
| 4,727,853 | 3/1988 | Stephen et al. | 99/444 X |
| 4,750,276 | 6/1988 | Smith et al. | 99/475 X |

FOREIGN PATENT DOCUMENTS 67951 12/1982 European Pat. Off. ............ 219/400
510645 8/1939 United Kingdom ................. 99/444

Primary Examiner—Stephen Marcus
Attorney, Agent, or Firm—Hubbard, Thurman, Tucker & Harris

[57] ABSTRACT

An air slot cooking grill utilizes one or more jet curtain plates to form rectangularly cross-sectioned heated air jets which begin to diffuse or "plume" slightly before impinging upon a food item supported on a gate member disposed within the grill housing. Each of the jet curtain plates has a corrugated cross-section defined by alternating series of parallel, generally V-shaped ridges which respectively project toward and away from the grate member, and a series of rectangularly cross-sectioned air formed in apex regions of the series of ridges which project toward the grate member. The ridges which project away from the grate member function to facilitate an even distribution of supply air to the air slots from a supply plenum disposed within the housing and bounded by the jet curtain. One or more supply fans and associated heating elements are utilized to create within the housing a recirculating flow of heated air which is forced through the jet curtain plate or plates toward the grate member and food items disposed thereon, and then returned to the fan. The jet curtain plate ridges may also be used as sloped drainage troughs to receive and drain away grease or other liquids falling from the food items being cooked. In several embodiments of the grill a heat sink member is positioned in the recirculating air flow path to absorb and store heat from the air. The stored heat is released to the air in response to a temperature drop therein when cold food items are placed in the grill during sequential batch cooking operations to significantly reduce the individual batch cooking time.

78 Claims, 14 Drawing Sheets

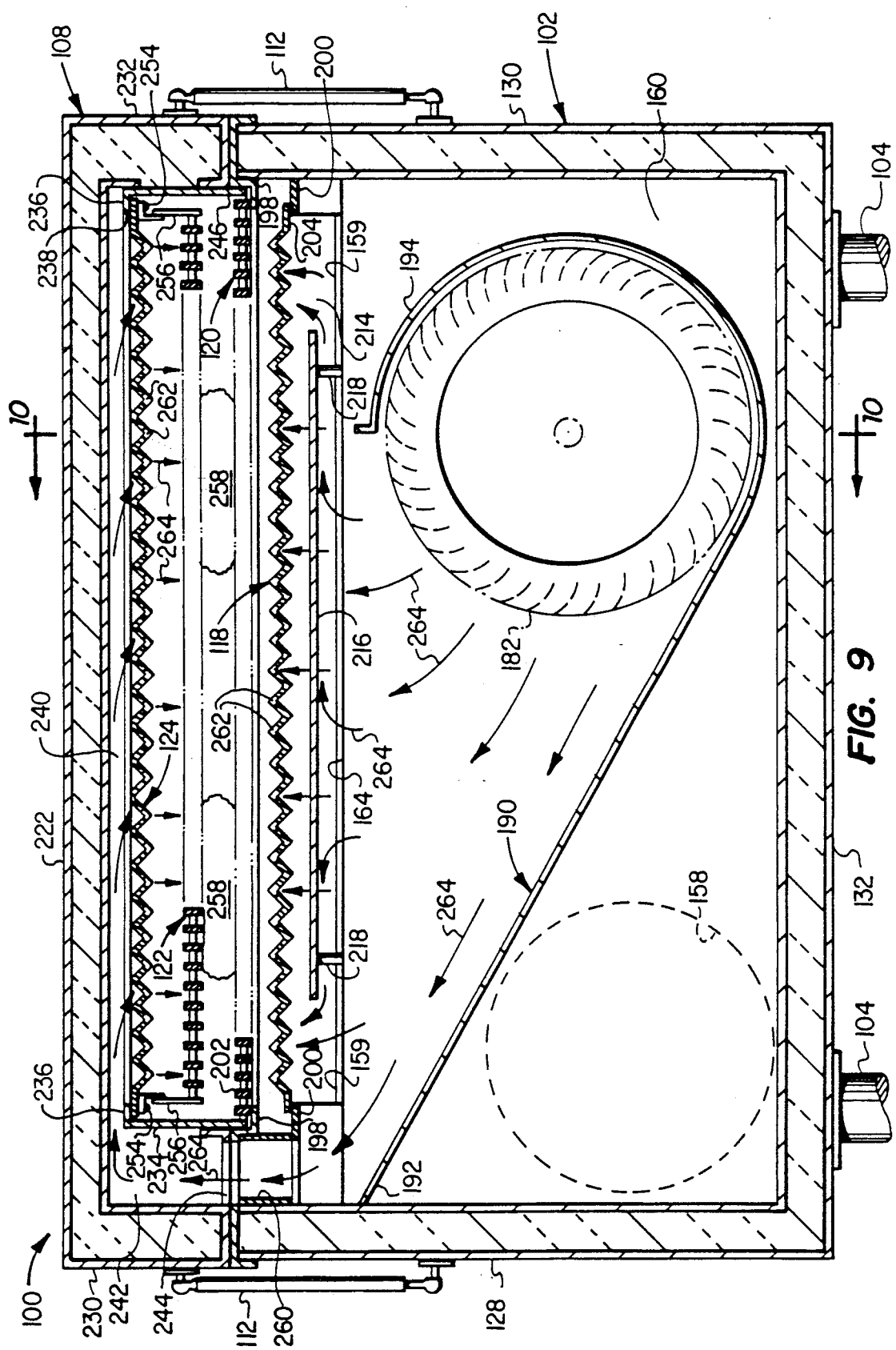

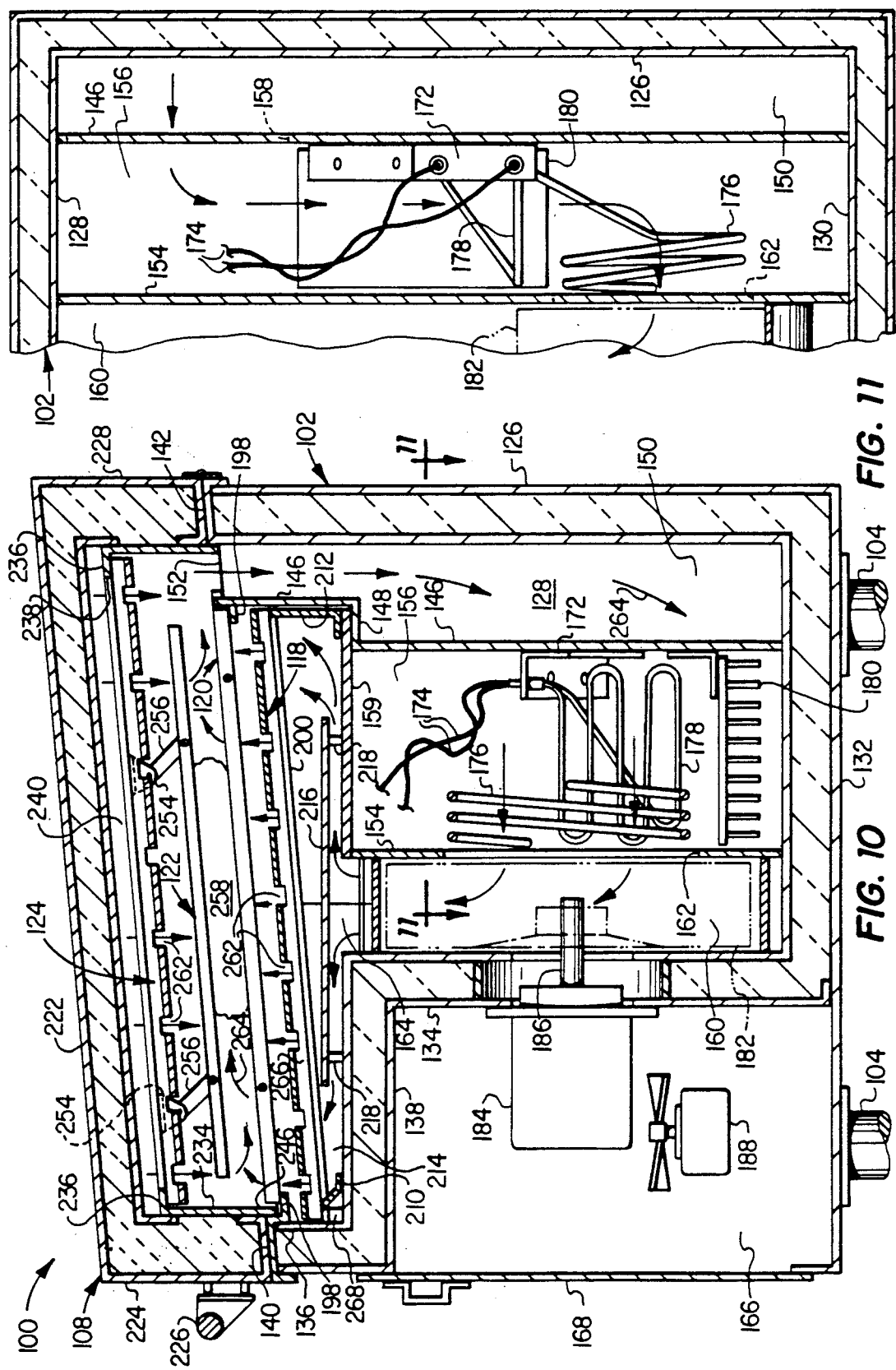

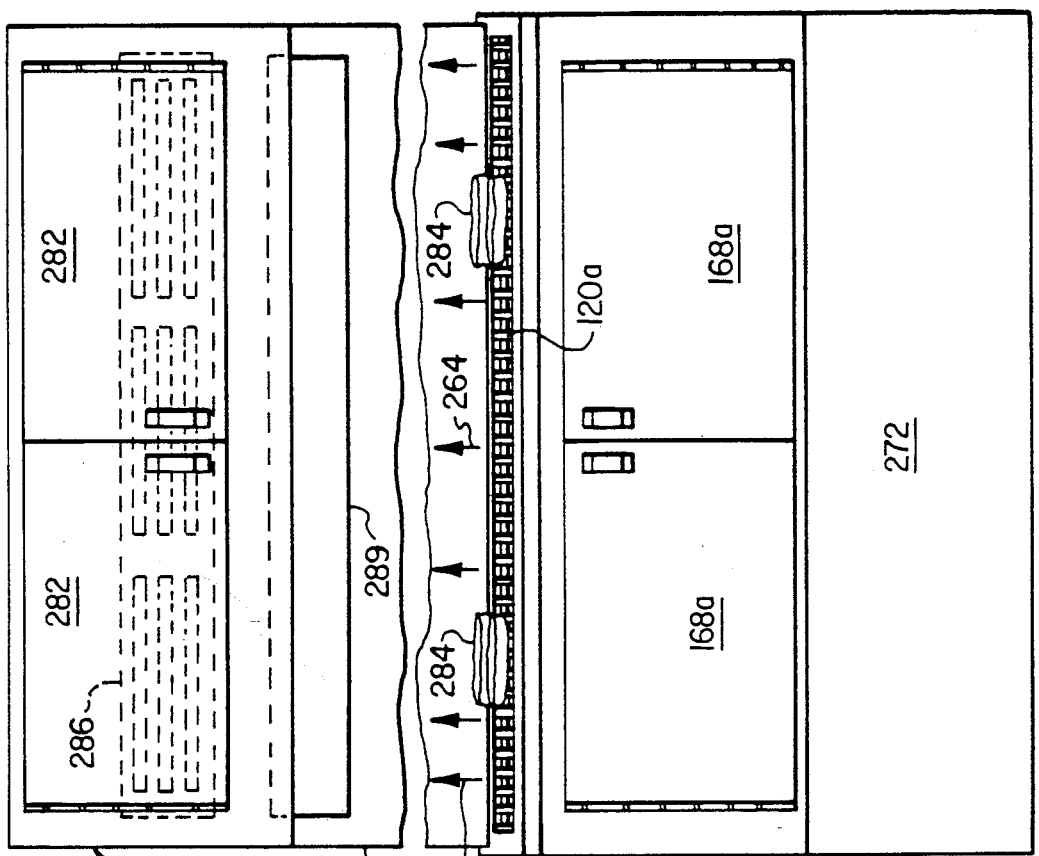
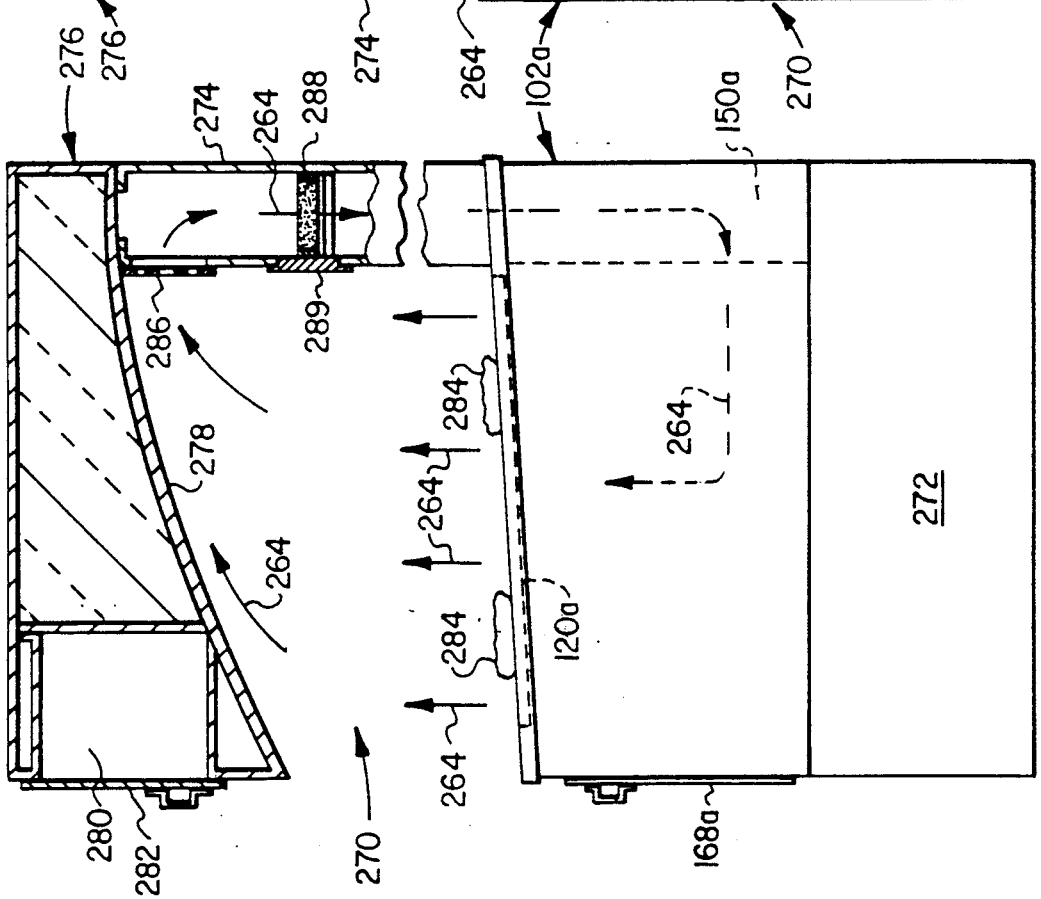
FIG. 13
FIG. 12

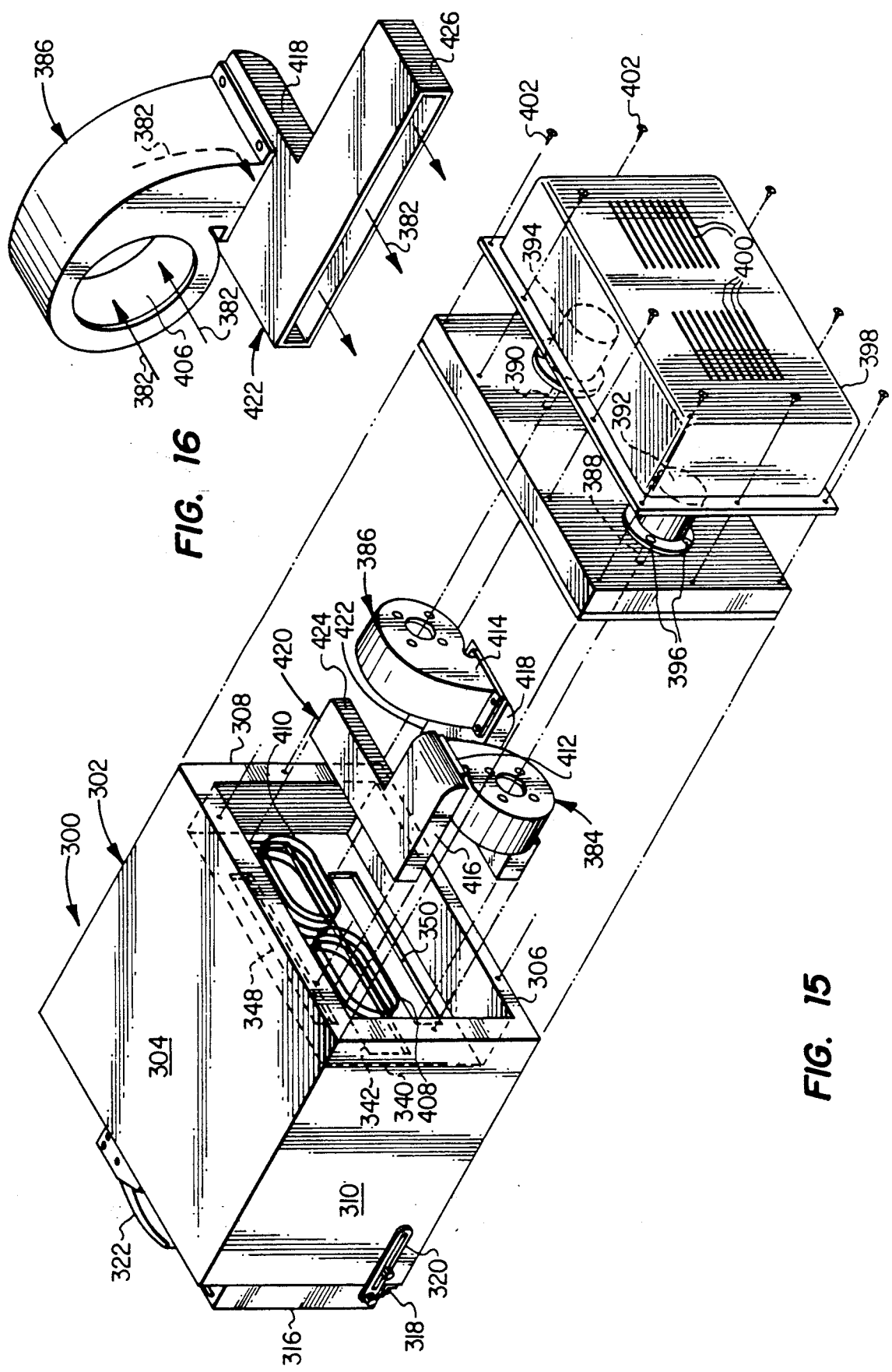

AIR SLOT COOKING GRILL

BACKGROUND OF THE INVENTION

1. Field of the Invention

The present invention relates to a food preparation apparatus and more particularly to a high velocity air slot device for grilling or cooking food.

2. Description of the Prior Art

Foods, especially meat sections, are desirably grilled upon an open surface over a high temperature heat source such as heating elements, charcoal briquets, gas burners or even open flames. Grilling gives the food a unique combination of texture, flavor, odor and appearance and in particular provides flavor enhancement by browning portions of the food in contact with the grill. The browning of the food involves a complex carmelizing process which takes place on the surface of the food. The carmelizing process involves the nature of the food and its juices and moisture, and is largely responsible for the unique "charcoal grill" flavoring imparted to the food being grilled.

Conventional grills include a grill to cook and support food products. The grill is located above a heat source, such as those mentioned above, which is contained in a cavity directly below the grill. The heat source of such grills operates at very high temperatures up to and including the temperature of burning charcoal, open gas flame tips or cherry red electrical elements. To cook the food products supported on the grill such devices depend, to a large extent, upon direct heat transfer through radiation together with some convection heating through the air and some conduction heating through the grill surface which results from a combination of radiation heat transfer and convection heating. After grilling, the food product bears an imprint of the grill work pattern on its surface which are carmelized portions of high flavor enhancement resulting from contact with the grill.

Conventional grills usually do not possess means for temperature regulation, but instead operate at unregulated high temperatures in order to sear and cook rapidly, rather than bake, the food product being grilled. The high operating temperatures of such grills are frequently above the ignition point of grease which accumulates along with food juices and moisture, and drips onto the heat source causing undesired flames and smoke.

Some conventional grills have means to control energy input and consequently the temperature of the heat source. In such devices the speed of cooking can be controlled, and smoke and flames caused by burning grease can be minimized. This is generally an unsatisfactory approach, however, since reducing the temperature of the heat source drastically reduces the amount of heat that can be transferred to the food. Specifically, reducing the temperature of the heat source diminishes the effect of radiation heat transfer and leaves a grill operator with only relatively inefficient convection heating to cook the food.

Other conventional grills employ blowers and plenum chambers to force air past a heat source and improve heat transfer efficiency by artificial movement of air from a heat source to a food product. After the air is forced past the food product, however, it is generally exhausted to the atmosphere and heat is therefore inefficiently applied to the food. Furthermore, such grills usually have commercial rather than domestic application, are generally large and heavy, and do not provide truly appetizing charcoal flavor to the food unless they employ essentially an open "fire" below the grates.

SUMMARY OF THE INVENTION

The present invention is directed to an air slot cooking device that avoids the above-mentioned disadvantages which are characteristic of the prior art. More specifically, the air slot cooking device of the present invention is a recirculating hot air system for grilling and cooking food products. The system has high heat transfer efficiency, reduces the time required to cook food products over that required by conventional grilling devices and provides foods having enhanced moisture retention.

The air slot cooking device of the present invention is formed from an enclosure having a bottom, side walls and a removable top. The enclosure defines a chamber having an air flow opening and an air passage opening.

A housing abuts a side wall of the enclosure. The housing communicates fluidly with the chamber through the air flow opening. A blower is disposed within the housing. The blower circulates air through the system and has air input means and air output means. The air input means of the blower is in fluid communication with the chamber through the air flow opening. The air output means of the blower is in fluid communication with the chamber through the air passage opening.

A grill having a high percentage of open area is disposed within the enclosure and divides the chamber into an operating space and a heat supplying space. The air flow opening is located in the operating space of the enclosure and the air passage opening is located in the heat supplying space of the enclosure.

A heat supplying element is disposed within the enclosure and is located in the heat supplying space. A jet curtain plate having an array of air slot openings is disposed within the enclosure and is located between the grill and the heat supplying element. If desired, a heat transfer plate may be disposed within the enclosure and located between the heat supplying element and the jet curtain plate, such heat transfer plate functioning both as an air baffle and as a source of radiant cooking heat.

In operation, air from the output means of the blower enters the enclosure through the air passage opening. The air is turbulized as it passes across and scrubs heat from the heat supplying element. The air is then directed to the array of air slot openings in the jet curtain plate. The air emanates as jets of air through the array of air slot openings in the jet curtain plate and is directed toward the grill. The air exits the enclosure through the air flow opening, enters the input means of the blower and is recirculated through the system.

The air slot cooking device of the present invention may be modified to have any shape enclosure, to include additional jet curtain plates or may be adapted for use in an existing grill.

The air slot cooking device of the present invention is preferably, a cooking device utilizing recirculating high velocity hot air in which the air is heated to temperatures of approximately 300° F. or higher and circulated at rates of approximately 300 feet per minute or higher.

In an alternate embodiment of the present invention, an impingement air cooking grill is provided which comprises a base housing and a lid housing hingedly connected thereto. Formed in the upper end of the base housing is a supply plenum which receives a lower grill member at its upper end, and a lower jet curtain plate disposed beneath the lower grill member. Extending along a rear wall portion of the base housing is a return plenum which has an open upper end disposed immediately rearwardly of the lower grill member. Beneath the base housing supply plenum are a heating plenum and a discharge plenum, the heating plenum being positioned between and communicating with the return plenum and the discharge plenum. The discharge plenum has an open upper end which communicates with the base housing supply plenum.

The lid housing also has a supply plenum formed therein, and an upper grill member which is supported within the lid housing for "floating" movement therein toward and away from its open lower end. An upper jet curtain plate is supported within the lid housing above the movable upper grill member and defines a lower boundary of the lid housing supply plenum. Extending along a sidewall portion of the lid housing is a transfer passage which communicates at an upper end portion thereof with the supply plenum in the lid housing. With the lid housing in its closed position, this transfer passage communicates with the base housing discharge plenum through a small sidewall transfer duct carried by the base housing adjacent one side of its upper end.

Cooking air within the base housing is heated by means of heating elements disposed within its heating plenum, the heating air being recirculated within the base and lid housings by fan means operatively disposed within the base housing discharge plenum. The discharge plenum has a lower wall which slopes downwardly from adjacent the transfer duct toward the fan impeller within the discharge plenum and then partially encircles the impeller to form a scroll portion around the impeller.

A food item may be cooked in this air slot grill embodiment by placing it on the lower grill member, moving the lid housing to its closed position, and turning the fan and heating elements on. With the lid housing in its closed position, the "floating" upper grill member automatically contacts and rests upon an upper surface portion of the food item regardless of its height. The rotating fan impeller creates within the base and lid housings a forced, recirculating flow of heated cooking air which sequentially flows into the base housing supply plenum and, via the transfer duct and the lid housing transfer passage, into the lid housing supply plenum. To assure even initial air distribution to the lower jet curtain plate from the discharge plenum, a horizontal baffle plate is interposed between the discharge plenum outlet and the lower jet curtain plate. Air within the upper and lower supply plenums is forced through the upper and lower jet curtain plates toward the upper and lower grill members and onto upper and lower surface portions of the food item being cooked, thereby rapidly and very evenly heating the food item and grilling it from both sides thereof.

After it strikes and heats the food item and the two grill members, the air then flows rearwardly and downwardly into the base housing return plenum. From the return plenum, the air is drawn horizontally into the heating plenum where it traverses and absorbs heat from the heating elements therein. Finally, to complete its recirculating path, the heating air is drawn into the fan impeller disposed within the base housing discharge passage.

To offset the initial interior temperature decrease within the cooking apparatus when cold food items are placed therein during repeated cooking cycles, a finned heat sink plate is positioned within the heating chamber and functions to store heat from the heating elements and release the stored heat to the cooking air in response to this initial temperature drop. The use of these heat sink means substantially reduces the time required for the internal temperature of the grill to be restored to its preselected cooking temperature when such cold food items are placed within the grill.

In a modification of this particular embodiment of the present invention, the lid housing is deleted and replaced with a warming hood structure which is positioned over the lower grill member in a vertically spaced relationship therewith. The hood structure basically comprises an insulated upper member which is positioned above the lower grill member and contains therein a food warming chamber in which food items, such as biscuits or the like, may be placed and kept warm during cooking of other items on the lower grill member. A vertically extending return duct is extended vertically between this upper warming member and the open upper end of the base housing transfer plenum. A suitable inlet opening is formed in the vertical return duct adjacent its upper end.

As food items are being cooked on the now-uncovered lower grill member, heated air upwardly discharged therethrough rises to contact and warm the insulated upper warming member portion of the grill. The base housing fan draws this air along the undersurface of the warming member, inwardly through the inlet opening formed at the upper end of the return duct, and then downwardly into the return plenum to thereby create a continuous flow of recirculating heated cooking air.

A further embodiment of the air slot cooking grill is also provided by the present invention and comprises a housing having a door that defines a front wall thereof, a rear wall, a vertically extending interior wall which divides the interior of the housing into a first chamber extending inwardly from the front wall and a second chamber extending inwardly from the rear wall, a transfer opening formed through a vertically intermediate portion of the interior wall, an upper supply opening formed through the interior wall above the transfer opening, and a lower supply opening formed through the interior wall below the transfer opening. An upper, generally horizontally extending jet curtain plate is supported within the first chamber between the upper supply opening and the transfer opening, the upper jet curtain plate defining a lower boundary of an upper supply plenum disposed within the first chamber above the transfer opening. In a similar manner, a lower jet curtain plate is supported within the first chamber between the lower supply opening and the transfer opening, the lower jet curtain plate defining an upper boundary of a lower supply plenum disposed within the first chamber below the transfer opening. A grill member is horizontally carried within the first chamber and is positioned between the upper and lower jet curtain plates to support a food item to be cooked.

Disposed within the second chamber are first and second supply fans whose outlets are respectively connected to the upper and lower supply plenums via small supply transfer ducts which are secured to the fan outlets and slidably received in the upper and lower supply openings. The two supply fans are secured to a removable rear wall of the second chamber so that the fans and their associated supply ducts may be quickly removed from the housing simply by removing such rear wall and pulling it outwardly from the balance of the housing.

During operation of this embodiment of the air slot cooking grill, the supply fans simultaneously force air into the upper and lower supply plenums and vertically through the upper and lower jet curtain plates onto the central grill member and a food item supported thereon. The air is then flowed through the transfer opening into the second chamber and across suitable heating elements disposed therein adjacent the inlets of the first and second supply fans. To facilitate an even distribution of the heated air to the jet curtain plates from the upper and lower supply plenums, means are provided in the supply plenum for creating turbulence in the heated air being delivered thereto. In the upper supply plenum such turbulence creating means comprise a finned heat sink plate which is generally horizontally disposed within the upper supply plenum with its fins projecting downwardly and extending in a direction generally transverse to the air flow into the upper supply plenum. The turbulence-creating means in the lower supply plenum comprise a generally horizontally extending plate member having at least one upwardly projecting baffle portion thereon. The finned heat sink plate disposed in the upper supply plenum functions to store heat and release the stored heat to the recirculating air in the event that the cooking temperature in the first chamber experiences a decrease when, for example, cold food items are initially placed on the central grill member and temporarily cools heated cooking air within the housing.

The jet curtain plates utilized in the various embodiments of the present invention are each preferably provided with a corrugated cross-section defined by alternating, contiguous series of parallel, generally V-shaped ridges which respectively project in opposite lateral directions. The air slot openings are formed in apex regions of one of these series of ridges. In the upper jet curtain plates previously described, the air slot openings are formed in the downwardly projecting series of ridges, while in the lower jet curtain plates the air slot openings are formed in the upwardly projecting series of ridges.

The ridges on each jet curtain plate which project into the supply plenum associated with such plate serve as balancing means to facilitate an even distribution of supply air to the air slot openings in such plate. Because of this unique balancing feature, potential cooking temperature variations across the length and width of the jet curtain plates are substantially eliminated. The downwardly projecting series of ridges in the lower jet curtain plate also advantageously function as drain troughs to receive and drain away grease or other liquids falling from the food items being cooked. To accommodate this drainage function of the downwardly projecting ridges, the lower jet curtain plates are supported in a sloping orientation with their associated cooking apparatus.

The slot discharge air balancing effect of the ridges is further enhanced by the configuration of the air slot openings themselves, the air slot openings being given a non-circular configuration—preferably a rectangular configuration. In developing the present invention, it has been discovered that this non-circular air slot configuration (unlike the traditional circularly cross-sectioned columnated jet orifices used in conventional impingement air cooking devices) affords the jet curtain plate with a substantial degree of inherent discharge flow balancing across its length and width. Additionally the air jets emanating from these rectangularly cross-sectioned slots, unlike columnated circular jets, begin to diffuse or "plume" just prior to striking the grill member or members and the food items carried thereby. This plume effect of the rectangularly cross-sectioned jets causes the jets, as they strike the food item, to at least slightly overlap to provide a very uniform impingement pattern which completely covers the surface or surfaces of the food item being cooked. Importantly, this feature of the present invention allows the food items surface to be uniformly covered by the impingement air so that the food item is uniformly and thoroughly cooked without the previous necessity of moving the food item relative to the air jets within the cooking apparatus.

The various air slot cooking grill devices provided by the present invention offer a wide range of advantages over conventional impingement air cooking devices. For example, the air impingement grills of the present invention provide for very rapid cooking of the food item in a uniformly even manner which seals in the juices and greatly enhances the flavor of cooked meat products. Additionally, because of the unique jet patterns formed within the various described cooking apparatus, grilling of meat products may be achieved with lowered air temperatures and air jet velocities compared to conventional columnated jet impingement air cooking devices. Because of the lowered cooking air temperatures required in the present invention, the possibility of cooking fires resulting from exceeding the "flash" point of grease released from meat products is substantially eliminated. Moreover, since a forced recirculating flow of heated cooking air is utilized, the air slot grills of the present invention provide for substantial energy cost savings and more efficient cooking compared to conventional open flame or non-recirculating grilling devices.

Finally, in developing the present invention it has been discovered that the use of this recirculating, air slot impingement cooking method substantially retards the onset of rancidity of the cooked food product which, in commercial applications, is typically placed in a holding area prior to being served to customers. This unique result significantly increases the available "shelf life" of the cooked food products which, in turn, greatly reduces the amount of cooked food which must be discarded if not served in a relatively short time. While the exact mechanism of such retardation of the onset of rancidity in the cooked food product is not known at this time, it is theorized that it stems from the very rapid influx of impingement air cooking heat into the food item provided by the various impingement air cooking and grilling apparatus of the present invention.

BRIEF DESCRIPTION OF THE DRAWINGS

In describing the present invention, reference will be made to the accompanying drawings in which:

FIG. 9 is an enlarged scale cross-sectional view through the grill of FIG. 7, taken along line 7—7 therein, with its lid in a closed position;

FIG. 10 is a cross-sectional view through the grill taken along line 10—10 of FIG. 9;

FIG. 11 is a partial cross-sectional view through the grill taken along line 11—11 of FIG. 10;

FIG. 12 is a vertically foreshortened, partially sectioned side elevational view of an open-topped version of the air slot cooking grill of FIGS. 7-11;

FIG. 13 is a vertically foreshortened front elevational view of the cooking grill of FIG. 12;

FIG. 15 is a partially exploded rear perspective view of the countertop grill;

FIG. 16 is an enlarged scale perspective view of a supply fan and outlet duct portion of the countertop grill;

DETAILED DESCRIPTION OF THE PREFERRED EMBODIMENTS

Figure 1:
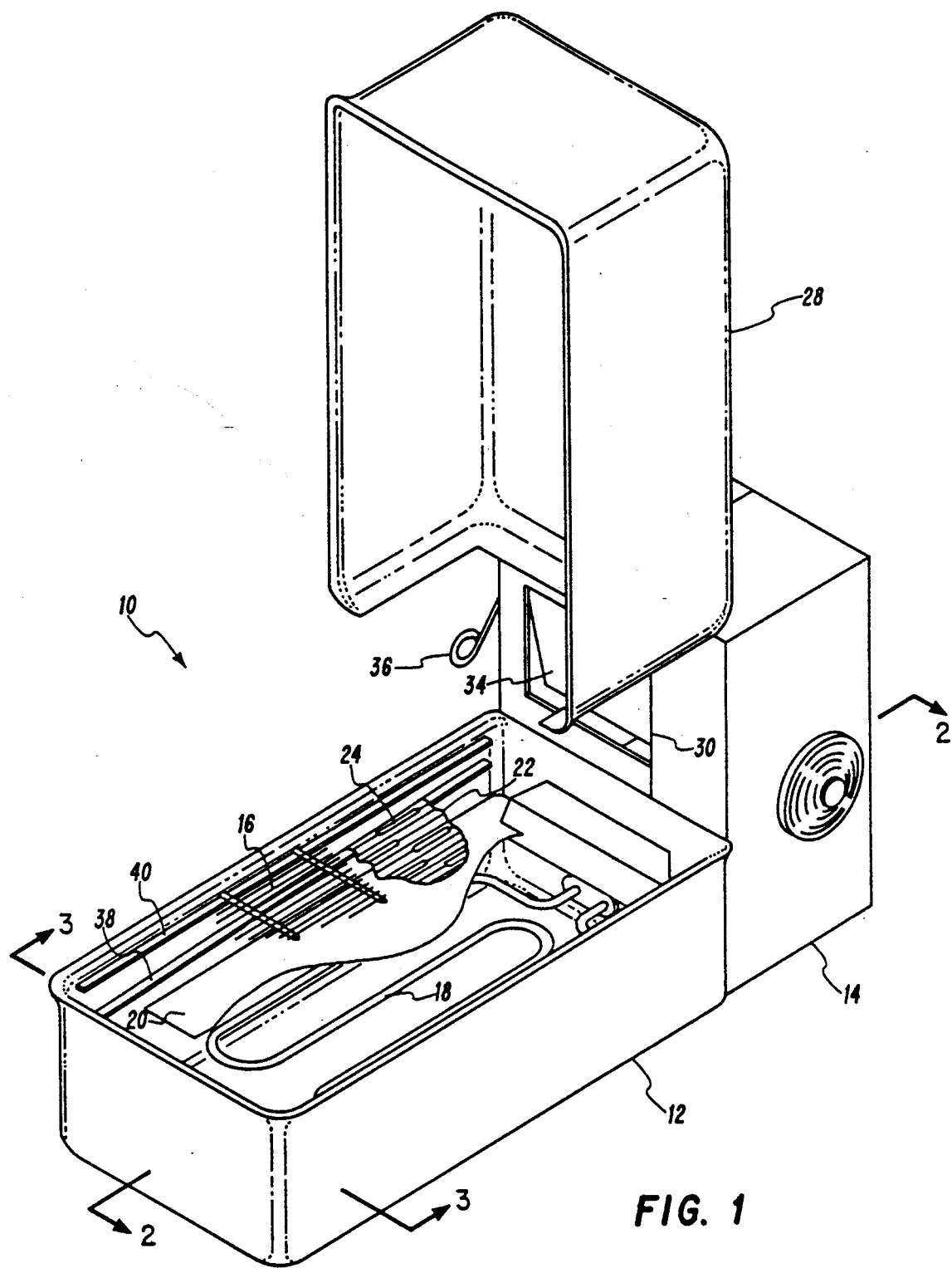
FIG. 1 is a perspective view of the air slot cooking grill of the present invention.
Figure 2:
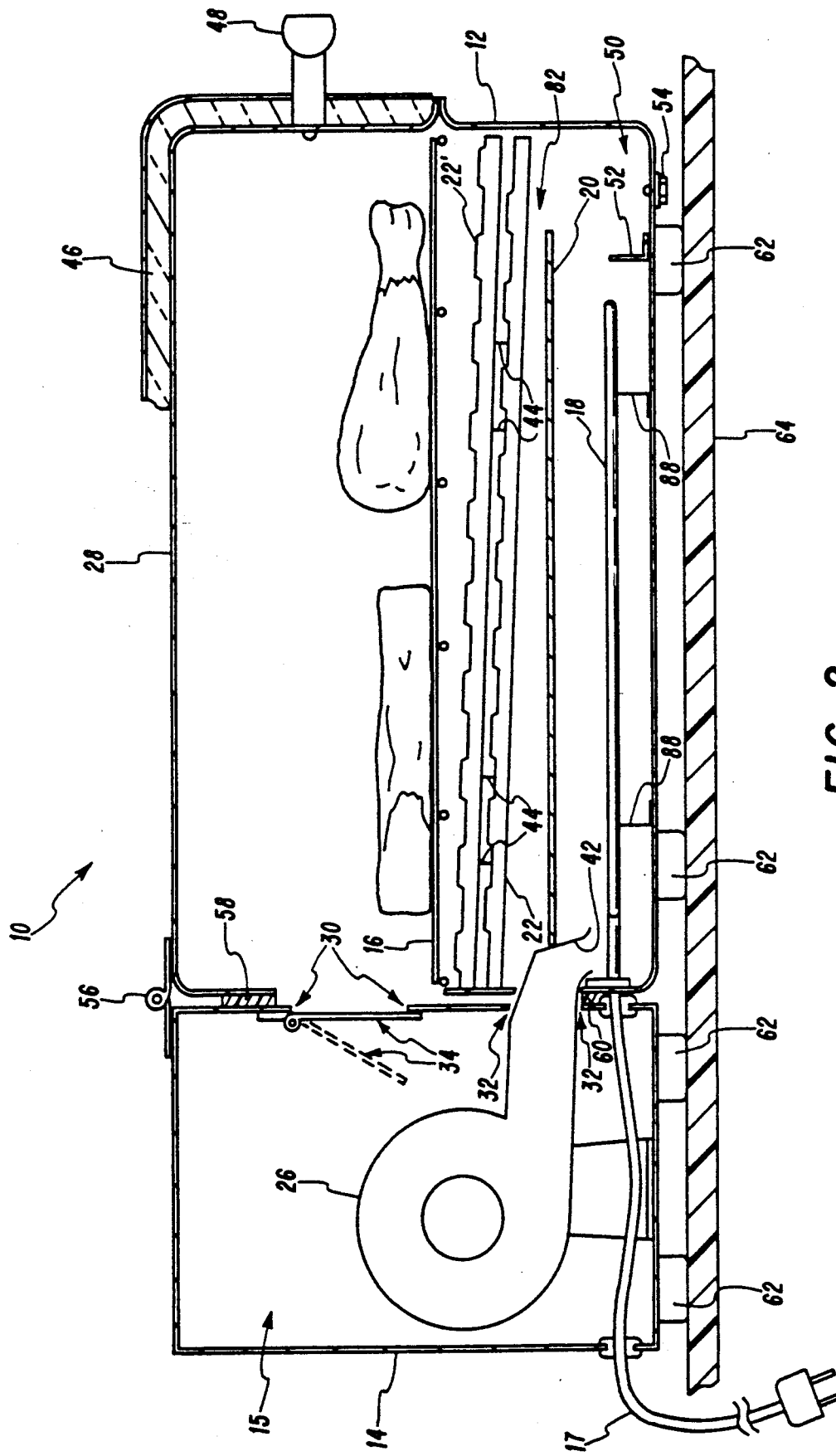
FIG. 2 is a longitudinal sectional view taken along line 2—2 of FIG. 1.

Referring now to the drawings, and in particular FIG. 1, an air slot cooking grill generally indicated at 10 includes a recirculating hot air system in an enclosure 12. The enclosure 12 has a base and side walls defining a chamber. The chamber preferably has a rectangular configuration but may be of any configuration desired. The enclosure 12 is abutted by a housing 14. As shown in FIG. 2, a gasket 60 may be disposed between the housing 14 and the enclosure 12 to prevent air from escaping from the system.

A grill 16 to support food for cooking is disposed above the base and within the enclosure 12. The grill 16 rests upon and is supported by a flange 40. The grill 16 extends to all side walls of the enclosure chamber and divides the enclosure chamber into an operating space above the grill 16 and a heat supplying space below the grill 16. As shown in FIG. 2, an air flow opening 30 in the housing 14 communicates fluidly with the operating space of the enclosure 12 so that air from the operating space can pass into the housing 14. The air flow opening 30 may be adjusted by a control device 34 such as a flapper or gate to regulate the amount of air flowing through the air flow opening 30. The control device 34 may be adjusted by a handle 36.

The housing 14 defines a plenum chamber 15 and includes a blower 26 for circulating heated air. The blower 26 has air input means and air output means. The input means of the blower 26 is in fluid communication with the operating space of the enclosure through the air flow opening 30. The output of the blower 26 is attached to a transfer connection 42 which passes through an air passage opening 32 in the housing 14 and enters the heat supplying space of the enclosure chamber. By operating the blower 26, air can be circulated from the enclosure chamber operating space into the housing 14, through the blower 26 and transfer connection 42, and back into the heat supplying space of the enclosure chamber.

A heat supplying element 18 is mounted in the heat supplying space and above the base of the enclosure chamber. The heat supplying element 18 is supported on the base by a plurality of supports 88. The heat supplying element may be supplied with energy from an external source such as through cord 17. The heat supplying element 18 extends over a considerable portion of the base and particularly toward the transfer connection 42.

A heat transfer plate 20 may optionally be disposed in the heat supplying space of the enclosure chamber spaced apart and above the heat supplying element 18. If included, the heat transfer plate 20 defines a turbulized air control space containing the heat supplying element 18 and located between the base of the enclosure and the heat transfer plate 20. If included, the heat transfer plate 20 also defines an air transfer passage 82 adjacent a side of the enclosure opposite the air flow opening 30 and the transfer connection 42. If included, the heat transfer plate 20 prevents air from entering the operating space of the enclosure chamber except through the air transfer passage 82. If the heat transfer plate 20 is included, when the blower 26 is operated, air enters the enclosure 12 through the transfer connection 42 and below the heat transfer plate 20 and moves through the heat supplying space to the air transfer passage 82 defined by the heat transfer plate 20.

A jet curtain plate 22 is mounted in the heat supplying space of the enclosure chamber and is spaced apart and above the heat supplying element 18, as well as heat transfer plate 20 if included. The jet curtain plate 22 rests upon and is supported by a flange 38. The jet curtain plate 22 extends to all side walls of the enclosure chamber and defines a turbulized air control space between the heat supplying element 18 or heat transfer plate 20 and the jet curtain plate 22. The jet curtain plate 22 contains an array of slots 24 through which turbulized air from the turbulized air control space is unturbulized and directed in a series of jet streams toward food supported on the grill 16. The slots 24 of the jet curtain plate 22 vary in width, length and number in relation to the horsepower of the blower to yield jets of air emanating from the slots 24 at a velocity of from 300 to 4000 feet/minute and preferably from 300 to 1700 feet/minute. The velocity of air emanating from the slots 24 may be measured by a Dwyer Air Velocity Calculator: #460 Air Meter made by Dwyer Instruments, Inc., Michigan City, Indiana under U.S. Pat. No. 2,993,374. When a 1/25 horsepower, 3400 RPM, squirrel cage blower with a 7.31 square inch nozzle was used, 66 slots totalling 20.46 square inches of slot area yielded an adequate velocity of air emanating from the slots. The slots 24 may be varied in size to yield streams of air having different velocities at different areas of the jet curtain plate 22. Such an arrangement provides areas in the grill having different cooking speeds. The jet curtain plate 22 distributes heat uniformly and efficiently to the surface of the food being cooked across the entire surface area of the grill 16. The unturbulized air emanating from the slots 24 of the jet curtain plate 22 travels toward the operating space of the enclosure chamber where it can be circulated back through the housing 14 and blower 26 to again enter the heat supplying space of the enclosure chamber. When the blower 26 is operating, a continuous stream of air flows through the entire system. Turbulized air from the blower 26 scrubs the heat supplying element 18 and picks up heat which is then delivered to the food by the high velocity jets of air emanating from the slots 24 of the jet curtain plate 22.

Figure 3:
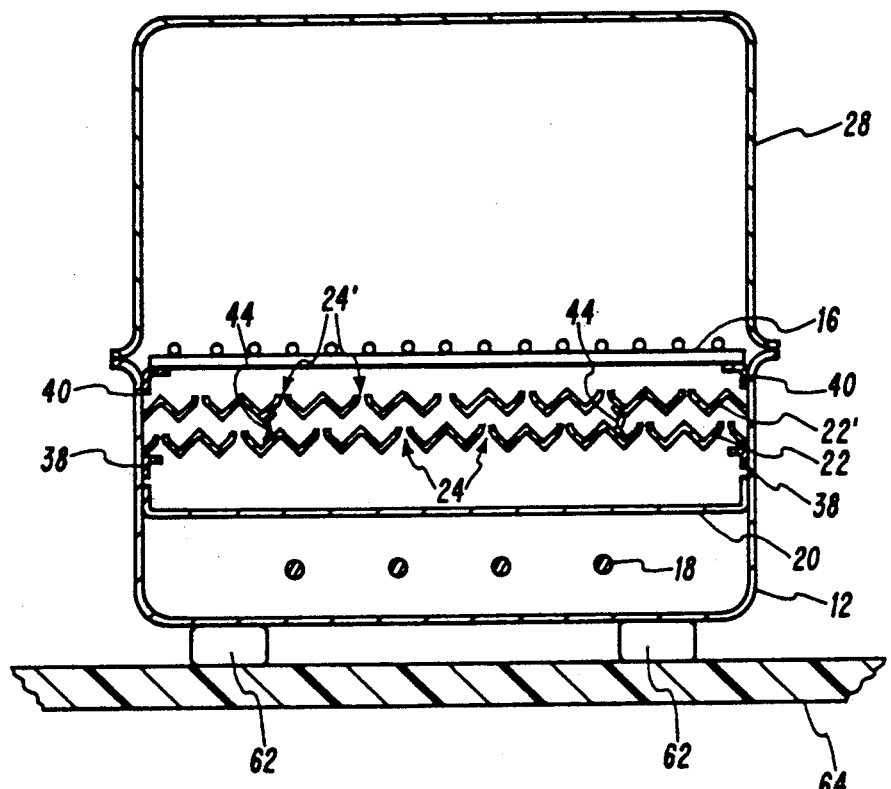
FIG. 3 is a transverse sectional view taken along line 3—3 of FIG. 1.

The jet curtain plate 22 is uniquely corrugated in a pattern of rounded v-shaped corrugations alternately v-shaped and inverted v-shaped. As shown in FIG. 3, the slots 24 of the jet curtain plate 22 are disposed in the crests rather than the troughs of the v-shaped corrugations.

In operation, high velocity air emanating from the slots 24 of the jet curtain plate 22 heats the food and tends to prevent grease from dripping through the slots 24 into the heat supplying space. Instead, grease drips into the troughs between the slots 24. Preferably, the jet curtain plate 22 is inclined at a slight angle from the horizontal, as shown in FIG. 2, so that the grease in the troughs runs to one side of the jet curtain plate 22 where it can drop downwardly toward the heat supplying space into a collecting area 50. Those skilled in the art will recognize that holes may be provided in the downwardly inclined end of the jet curtain plate 22 to aid in the removal of grease from the jet curtain plate 22. The collecting area 50 may preferably be defined by a dam member 52 disposed on the rectangular base of the enclosure in an end portion of the heat supplying space. A drain 54 may be provided in the collecting area 50 to remove accumulated grease. Those skilled in the art will recognize that any collecting member that can withstand hot grease such as a metal tray may be disposed in the collecting area 50. Grease dripping from the jet curtain plate 22 is effectively prevented from contacting the heat supplying element 18 since the heat supplying element 18 does not extend into the collecting area 50 of the enclosure. Thus the apparatus of the present invention greatly reduces or eliminates flame-ups, excessive smoke or off flavor that would result from grease contacting a high temperature heat supplying element. Smoking and flaming of grease drippings is effectively prevented by the present apparatus because the grease drippings are collected and prevented from falling on the heat supplying element 18. Even if some grease falls through the slots 24 onto the heat supplying element 18, the jet curtain plate 22 acts as a flame barrier so that rising flames from burning grease cannot reach the food being cooked where it could cause damage to the food or add the bitter flavor of burned grease.

If included, the heat transfer plate 20 adds to the efficient transfer of heat from the heat supplying element 18 to the moving air. The heat transfer plate 20 collects heat from radiation and convection heat transfer and transfers this heat to the moving air which is thus more uniformly heated before passing upward through the slots 24 of the jet curtain plate 22.

Also, the extreme efficiency of jets of high velocity heated air emanating from the slots 24 of the jet curtain plate 22 speeds the cooking of the food supported on the grill without requiring an extreme differential between the temperature of the heat supplying element and the temperature of the air. Unused heat contained in the recirculating air is conserved by the apparatus of the present invention which may be insulated to reduce heat loss. It is therefore possible to provide quick efficient cooking of food with air heated to about 300°–500° F. and preferably to about 400°–500° F. without requiring the heat supplying element 18 to run at full capacity, which conserves energy and reduces the tendency of grease that does manage to contact the heat supplying element 18 to smoke and flame.

The enclosure 12 is also provided with a removable top. The removable top is preferably an access cover 28 as shown in FIGS. 1 and 2. The access cover 28 is openable into the operating space of the enclosure to provide access to the grill 16. The access cover 28 may constitute a portion of the enclosure located above the grill 16 and preferably constitutes the entire top section of the enclosure 12. Also, the access cover is preferably attached to the housing by a hinge 56 so the cover may be raised in order to provide access to the grill 16. A gasket 58 may be disposed between the housing 14 and the access cover 28 to prevent heated air from escaping from the enclosure 12. Most preferably, insulation 46, a handle 48 and a viewing port (not shown) are provided on the access cover 28 for convenience. Those skilled in the art will recognize that any type of access cover that will provide access to the grill 16 may be utilized in the present invention.

The above-described air slot cooking grill may rest upon a support surface 64 and be spaced from the support surface by a plurality of spacer legs 62.

A preferred embodiment of the present invention similar to the embodiment described above, is shown in FIGS. 2 and 3. In this embodiment, a second jet curtain plate 22' is mounted in the heat supplying space of the enclosure chamber and is spaced apart from and between the first jet curtain plate 22 and the grill 16. The second jet curtain plate 22' is spaced from the first jet curtain plate 22 by a plurality of supports 44. The second jet curtain plate 22' has an array of slots 24' similar to the array of slots 24 in the first jet curtain plate 22. The slots 24' are staggered with the slots 24 of the first jet curtain plate, as shown in FIG. 3, to provide a lateral offset between the slots of the two jet curtain plates 22 and 22'. The slots 24' of the second jet curtain plate 22' may also be offset longitudinally with the slots 24 of the first jet curtain plate 22. A turbulized air control space is created between the first jet curtain plate 22 and the second jet curtain plate 22'. The second jet curtain plate 22' is nearest the grill 16 and ultimately the recirculating air reaches the grill 16 through the slots 24' of the second jet curtain plate 22'. Preferably, both jet curtain plates 22 and 22' are inclined slightly at an angle from the horizontal so that grease drippings can run off from either plate to the previously defined collecting area 50.

The second jet curtain plate 22' is added to the apparatus to obtain better mixing of the heated air. Specifically, as heated air passes through the slots 24 of the first jet curtain plate 22 into the turbulized air control space it is required to shift laterally or longitudinally to finally emanate through the slots 24' of the second jet curtain plate 22' as an unturbulized jet stream into the operating space of the enclosure chamber. This staggered slot arrangement requires that any grease dripping through a slot 24' of the second jet curtain plate 22' necessarily falls onto an unslotted trough of the first jet curtain plate 22 and then is diverted to the collection area 50. Thus, the staggered slot arrangement totally eliminates the possibility of grease dripping downwardly into the heat supplying space and onto the heat supplying element 18.

Figure 5:
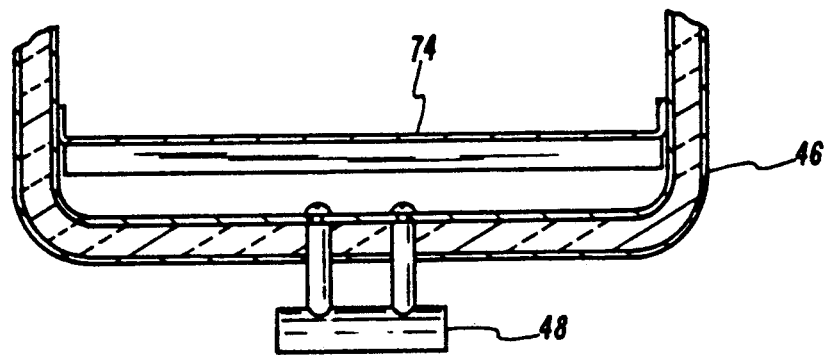
FIG. 5 is a detail sectional view taken along line 5—5 of FIG. 4.
Figure 4:
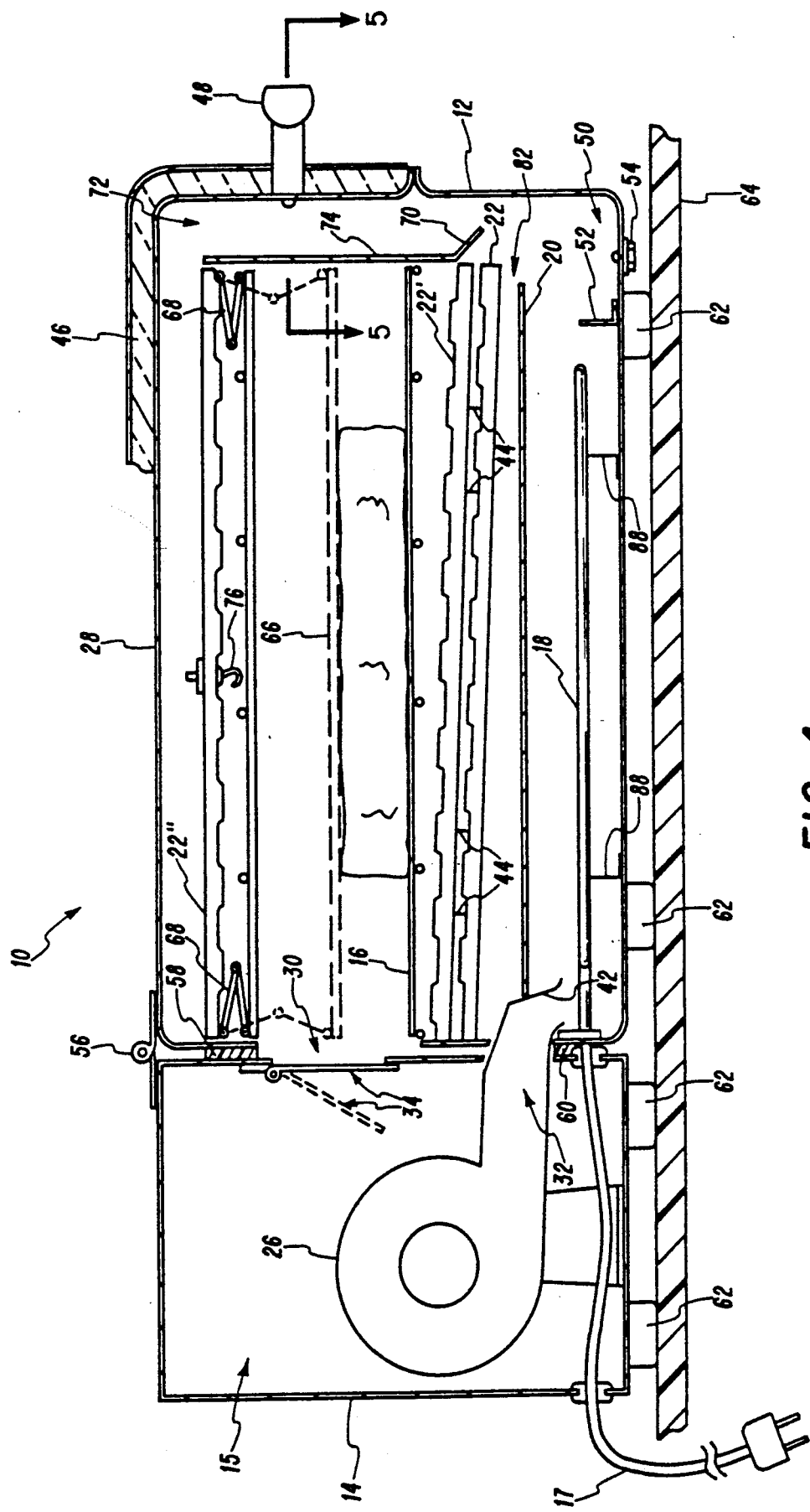
FIG. 4 is a longitudinal sectional view similar to FIG. 2 of an alternate embodiment of the present invention.

An alternate embodiment of the present invention is shown in FIGS. 4 and 5. In this embodiment, a jet curtain plate 22″ is located in the operating space of the enclosure chamber above the grill 16 and spaced apart downwardly from the removable top 28 of the enclosure. The first jet curtain plate 22 or the first and second jet curtain plates 22 and 22′ and the grill 16 may all be coextensively shortened, compared to the embodiments shown in FIGS. 2 and 3, at an end opposite the housing 14. The jet curtain plate 22 or plates 22 and 22′ below the grill 16 and the jet curtain plate 22″ above the grill may be mounted at the side of the enclosure chamber opposite the shortened ends. A wall member 74 having a diverter 70 at one end thereof may be disposed within the enclosure and may be located across the shortened ends of the jet curtain plate 22 or plates 22 and 22′ and the grill 16. The wall member 74 extends upward to the jet curtain plate 22″ and defines an air column space 72 between the wall member 74 and the enclosure 12. The air column space 72 communicates fluidly with the heat supplying space, and a top air control space located between the jet curtain plate 22″ and the enclosure 12.

When air is circulated by the blower 26 into the heat supplying space it passes across the heat supplying element 18 and if the heat transfer plate 20 is included, enters the air transfer passage 82. A first portion of the air is diverted by the diverter 70 into the air control space or spaces between the jet curtain plate 22 or plates 22 and 22′ and the grill 16, and a second portion of the air is diverted by the diverter 70 upwardly through the air column space 72 into the top air control space between jet curtain plate 22″ and the enclosure 12. Unturbulized jet streams of air are thus directed toward the top and bottom surfaces of the grill 16. This arrangement provides for very fast cooking since additional heat is transferred to food placed on the grill by the additional impingement of high velocity air from jet curtain plate 22″. Dead air spaces are scrubbed away by the high velocity air and mixing of the opposing air jets around the edges of the food being cooked which improves heat transfer and results in still faster cooking.

Those skilled in the art will recognize that the diverter 70 may be replaced by one or more chimneys located adjacent any side wall of the enclosure 12. Such chimney or chimneys being in fluid communication with the heat supplying space and the top air control space.

The above-described alternate embodiment of the present invention may be further modified by providing a grid 66 of generally flat configuration having its edges spaced apart a non-interfering distance from the side walls of the enclosure. The grid 66 is flexibly hung below jet curtain plate 22″ by supports 68, such as knee hinge supports, which permit relative movement of the grid 66 in a vertical direction. The grid 66 is spaced apart above the grill 16 and is adjustably positioned within the flexible adjustment range of the supports 68 to rest upon the surface of food being cooked. The grid 66 may be retained by a catch 76 when not in use. Jet curtain plate 22″, grid 66 and supports 68 are preferably attached to the access cover 28 and are accordingly raised upwardly when the cover is opened. When hot air is circulated in the enclosure 12, the grid 66 is heated in a similar manner as the grill 16 and provides the same effect upon the surface of the food being cooked as the grill 16 such as the familiar grid pattern as well as the carmelized flavor enhancing areas. The grid 66 also aids in the efficient transfer of heat to the food being cooked thus contributing to both enhanced flavor and cooking speed. Because the food product is cooked from the top and bottom and has flavor enhancing carmelized areas on both surfaces, this embodiment of the present invention allows uniform cooking of the food without requiring the food to be turned.

Figure 6:
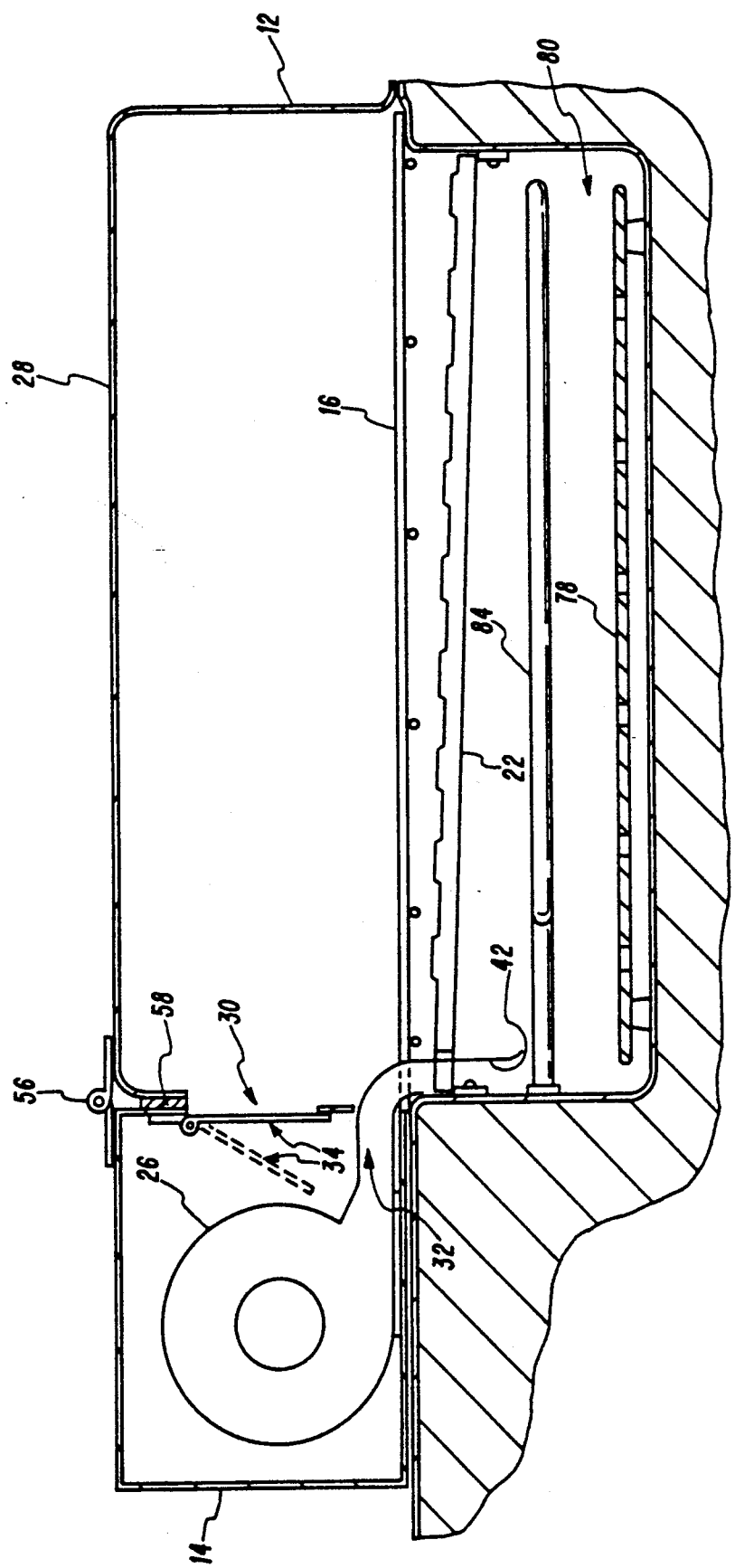
FIG. 6 is a longitudinal sectional view similar to FIG. 2 of an alternate embodiment of the present invention.

Another embodiment of the present invention as shown in FIG. 6, is a modified grill for a retrofit application which retains many of the advantages of the above-described embodiments, but does not contain all of the elements. The retrofit application may be used with a certain class of domestic type cooking ranges generally known as "Jenn-Air" ranges. Such ranges have a built-in grill portion consisting of a surface (not shown) and a sunken area 80 located below the surface. The sunken area 80 contains respectively upward from the bottom, a grease collecting plate 78 having a plurality of openings for grease drippings to run through and collect on the bottom of the sunken area 80, a horizontally disposed heating element 84 having snaked s-shaped curves separated by straight portions, and a grill surface (not shown). A separately located suction apparatus (not shown) draws smoke away from the grill. The purpose of such grills is to permit indoor grilling without generating excessive smoke.

The alternate retrofit embodiment of the present invention utilizes the sunken area 80, the grease collecting plate 78 and the heat supplying element 84 of a previously existing indoor grill. The existing grill surface, however, is removed and replaced with a slightly inclined jet curtain plate 22 as described above. The jet curtain plate 22 extends across the area of the existing unit and a grill 16 is located over the sunken area 80 and is spaced apart above the jet curtain plate 22. Part of the grill 16 and jet curtain plate 22 are cut away at one end and the cut away portion is occupied by a modified air transfer connection 42 extending above the surface of the grill 16 into a housing 14 and connected to a blower 26 of the type described above. The housing 14 abuts a modified enclosure 12 and is in fluid communication with the modified enclosure 12 through air flow opening 30. The modified enclosure 12 forms an operating space above the grill 16, has edges adapted to fit sealingly around the sunken area 80 at the level of the grill 16 and is completely open on the grill side.

This alternate retrofit embodiment functions in a manner similar to the above-described embodiments in that air is circulated by the blower 26 into a heat supplying area in a turbulent fashion through the modified air transfer connection 42, the heated air emanates as high velocity air streams toward the grill 16 through an array of slots in the jet curtain plate 22, the air impinges upon and cooks food placed on the grill 16, and the air is then recirculated. The jet curtain plate 22 performs its function of collecting and transporting grease drippings to one end of the sunken area 80 instead of allowing it to drip onto the heat supplying element 84. Thus, this alternate retrofit embodiment of the present invention significantly eliminates smoke and flaming problems of the existing units as well as greatly increasing the cooking rate because of the high velocity air directed toward the food. The auxiliary smoke removal portion of the existing units is not required in the retrofit application. The entire retrofit assembly including the housing 14, blower 26, air transfer connection 42 and enclosure 12 are plug-in units and are freely removable from the modified grill.

Illustrated in FIGS. 7-11 is a further embodiment 100 of an air slot cooking grill which is generally similar in operation to the grill previously described with reference to FIGS. 4 and 5. Among other differences therein, the grill 100 is considerably larger and is particularly well suited to commercial kitchen cooking operations in which fairly large quantities of meat products are to be grilled.

Figure 7:
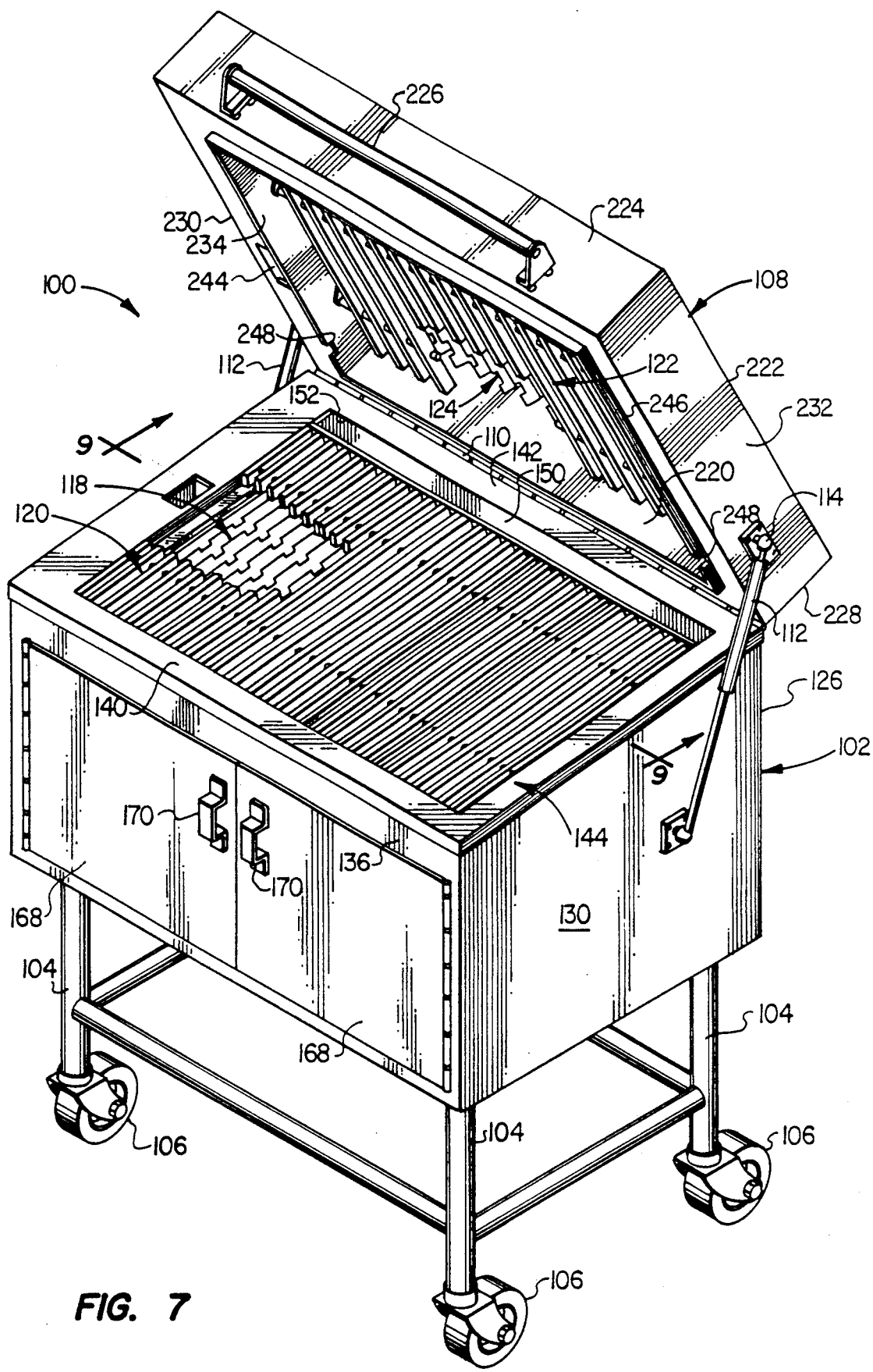
FIG. 7 is a partially cut-away perspective view of an alternate air slot cooking grill embodiment of the present invention with a lid portion thereof being in a partially opened position.
Figure 8:
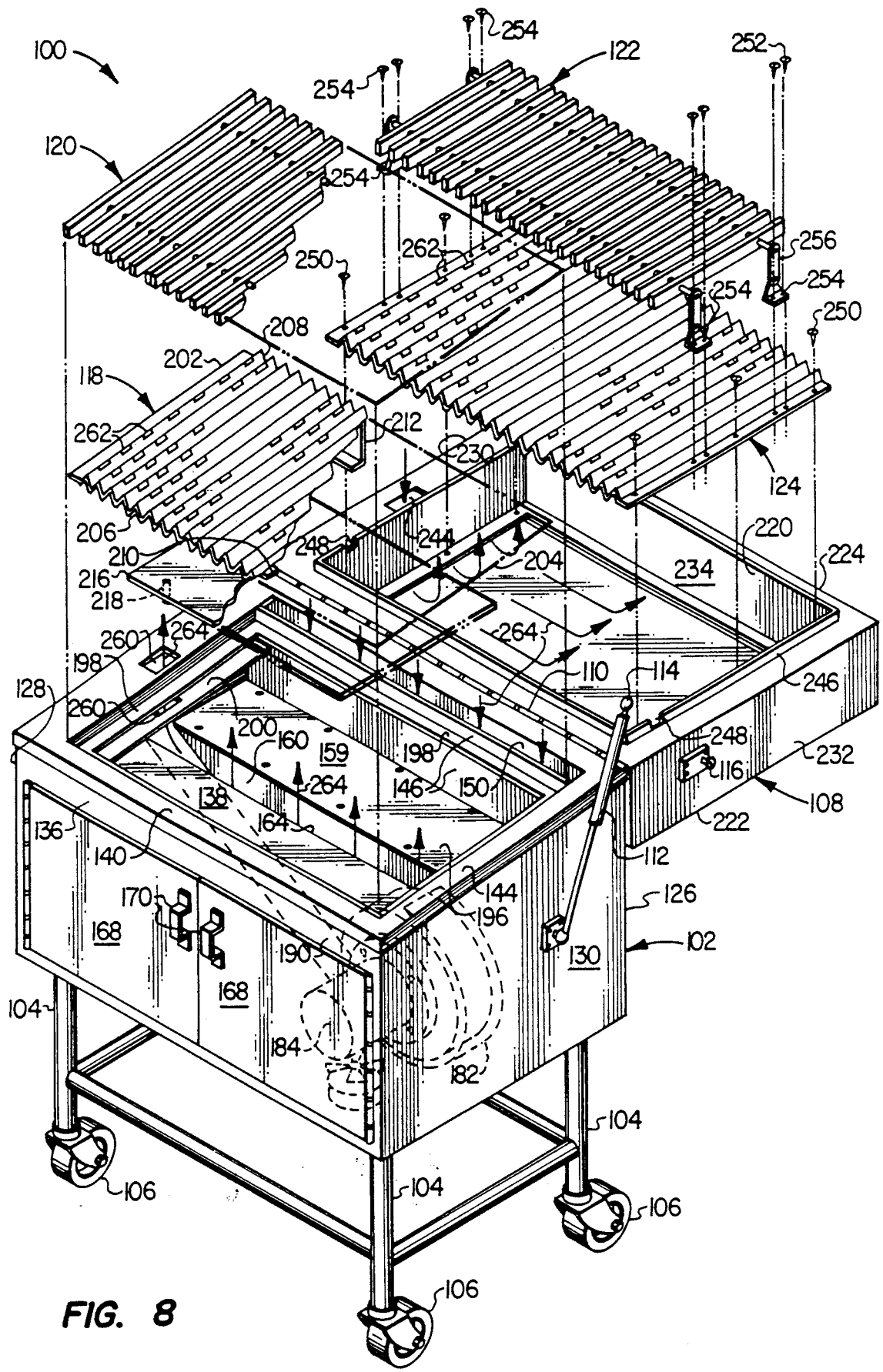
FIG. 8 is a partially exploded perspective view of the grill of FIG. 7 with the lid being in a fully open position and with portions of the exploded parts being shown in phantom for the purpose of illustrative clarity.

Referring first to FIGS. 7 and 8, the grill 100 comprises a generally rectangularly cross-sectioned base housing 102 supported on cross-braced, vertical support legs 104 which have suitable wheel assemblies 106 connected to their lower ends so that the base housing can be conveniently rolled to various desired locations in the cooking facility. Grill 100 is also provided with a lid housing 108 which is pivotally connected to the base housing by means of a piano hinge element 110 which extends along an upper rear edge of the base housing as depicted in FIGS. 7 and 8. The lid housing 108 is movable between a closed position (FIG. 9) through an intermediate open position (FIG. 7) to a fully open position (FIG. 8) relative to the base housing and is additionally interconnected to the base housing by a pair of conventional pneumatic cylinder support arms 112 which are conveniently operative to support the lid housing 108 in an intermediate position such as that depicted in FIG. 7. The upper ends of the support arms 112 are provided with socket elements 114 (FIG. 8) which may be snapped onto corresponding ball elements 116 secured to the lid housing.

The primary cooking elements of the grill 100 comprise a lower jet curtain plate 118, a lower grate or grill member 120, an upper grate or grill member 122, and an upper jet curtain plate 124.

As best illustrated in FIGS. 9 and 10, the base housing 102 has a cooking portion defined by a series of hollow, internally insulated exterior metal walls which include a rear wall 126, left and right sidewalls 128 and 130, a bottom wall 132, a lower front wall portion 134, and an upper front wall portion 136 which is positioned forwardly of wall portion 134 and is interconnected thereto by a horizontally extending cantilevered wall portion 138. The upper end 140 of wall portion 136 is somewhat lower than the upper end 142 of the rear wall 126 (FIG. 10) so that the open upper end 144 of the base housing 102 slopes downwardly and forwardly as indicated in FIGS. 7 and 8.

As best illustrated in FIGS. 10 and 11, the base housing 102 is provided with a vertically disposed interior wall 146 which is positioned forwardly of the rear insulated wall 126 and extends between the sidewalls 128 and 130. Interior wall 146 has, along an upper portion thereof, a rearward offset which defines a ledge 148 (FIG. 10). Walls 146 and 126 define within the base housing 102 a return plenum 150 which has an open upper end 152 immediately adjacent the upper end 142 of the rear exterior wall 126. Interposed between the lower front wall portion 134 and the interior wall 146 is another vertically disposed interior wall 154 which extends between the sidewalls 128 and 130. Interior walls 154 and 146 define therebetween a heating plenum 156 which communicates with the return plenum 150 via a large circular opening 158 (see also FIG. 9) formed through the interior wall 146 adjacent the exterior housing sidewall 128. The upper end of the heating plenum 156 is closed by a suitable cover plate 159 which rests upon the upper end of the interior wall 154 and the ledge portion 148 of the interior wall 146.

The lower front wall portion 134 and the interior wall 154 define therebetween a discharge plenum 160 which communicates with the heating plenum 156 via a large circular opening 162 formed through the interior wall 154 adjacent the insulated sidewall 130. The discharge plenum 160 has an open upper end 164 which extends between the upper ends of the front wall portion 134 and the interior wall 154.

The outer metal skins of the sidewalls and bottom wall 128, 130, 132 are carried forwardly to define beneath the cantilevered wall 138 a motor and control chamber 166 which is provided with a pair of hinged front access doors 168 (see FIGS. 7 and 10), each of which having a handle 170.

Supported on a suitable mounting bracket 172 (FIGS. 10 and 11) within the heating chamber 156, and operatively connected to a pair of power wires 174, are two electric heating elements 176 and 178. Heating element 176 has a helical cylindrical configuration and is coaxially disposed immediately adjacent the transfer opening 162 in the interior wall 154. Heating element 178 has a serpentine, generally planar configuration and is vertically disposed in the heating chamber 156 immediately behind the heating element 176 as viewed in FIG. 10. A finned metal heat sink plate 180 is secured to the mounting bracket 172 beneath the heating element 178.

To provide a forced, recirculating flow of heated cooking air within the base and lid housings 102, 108 in a manner subsequently described, a squirrel cage fan impeller 182 (FIGS. 8-11) is positioned within the discharge plenum 160, the circular inlet of the impeller 182 facing and being generally aligned with the transfer opening 162 formed in the interior wall 154. Impeller 182 is driven by a fan motor 184 mounted within the motor housing 166 and having a drive shaft 186 connected to the impeller. The fan motor 184 is cooled by a small cooling fan 188 mounted in the motor housing 166 beneath the fan motor, the motor housing 166 being provided with appropriate ventilation openings (not illustrated) formed in the walls thereof. As is best illustrated in FIG. 9, the discharge plenum 160 is provided with a sloping bottom wall 190 having a left end portion 192 (as viewed in FIG. 9) which is connected to the inner surface of the housing sidewall 128 at a level slightly below that of the heating plenum cover plate 159. From this connection point, the plenum wall 190 slopes downwardly and rightwardly to beneath the fan impeller 182 and then curves in a counterclockwise direction around approximately half of the circumference of the impeller to define a scroll portion 194 of the wall 190 which partially encircles the fan impeller 182.

As best illustrated in FIG. 8, upper end portions of the base housing walls 128, 130, 136 and 146 define with the cover plate 159 and the upper surface of wall 138 a generally rectangular upper end recess 196 within the base housing 102. Extending around the periphery of this recess 196 is a downwardly inset upper support flange 198 (see also FIGS. 9 and 10). Also disposed within the recess 196 are a pair of lower support flanges 200 which are disposed beneath the support flange 198 and extend inwardly from the base housing sidewalls 128 and 130. Like the upper end of the base housing 102, these support flanges 198, 200 are sloped downwardly and forwardly. Opposite end edge portions 202, 204 of the lower jet curtain plate 118 are supported on the lower support flanges 200 as best illustrated in FIG. 9.

Forward and rear side edge portions 206, 208 of jet curtain plate 118 are respectively provided with downwardly projecting support flanges 210, 212 which respectively rest upon the upper surface of housing wall 138 and the upper surface of the cover plate 159 (FIG. 10). Support flange 212 is considerably wider than the support flange 210 to conform to the downward and forward sloping of the end support flanges 200.

Supported in this manner, the lower jet curtain plate 118 defines a sloping upper boundary of a base housing supply plenum 214 (FIGS. 9 and 10) which is disposed immediately above the discharge plenum 160 and communicates therewith through the open upper end 164 of such discharge plenum. Positioned within the base housing supply plenum 214 is a generally horizontally extending baffle plate 216 which is positioned over the discharge plenum outlet opening 164 and is spaced slightly upwardly therefrom by four small support spacers 218 positioned adjacent the corners of the baffle plate.

The lid housing 108 has an open lower end 220 (FIG. 8) and is formed from hollow metal insulated walls consisting of a forwardly and downwardly sloping top wall 222, a front wall 224 having a handle bar 226 secured thereto, a rear wall 228, and left and right sidewalls 230 and 232. A metal strip 234 (FIGS. 9 and 10) extends around the interior periphery of the lid housing 108 and has, at its upper end, an inwardly turned flange portion 236 which defines a lower end opening 238 of a supply plenum 240 positioned between the flange 236 and the upper wall 222 of the lid housing. Along a side portion thereof supply plenum 240 communicates with a vertically extending transfer plenum 242 (FIG. 9) defined between the sidewall 230 and the metal strip 234 and having an inlet opening 244 extending along the lower end of the wall 230. A lower side edge portion 246 of the metal strip 234 (FIGS. 7, 8 and 10) projects downwardly from the open lower end 220 of the lid housing around its entire periphery and, when the lid housing is in its closed position, is closely received within the open upper end of the base housing to form a seal between the base and lid housings. The lower strip portion 246 is provided with suitable notches 248 which receive the upper end of the base housing interior wall 146.

The upper jet curtain plate 124 is secured around its periphery to the flange 236 (FIGS. 8 and 9) by suitable fasteners 250 so that the upper jet curtain plate 124 defines the lower boundary of the lid housing supply plenum 240. The upper grill member 122 is positioned beneath the upper jet curtain plate 124 and is also secured to the flange 236 by means of suitable fasteners 252 and mounting brackets 254. The upper grill member 122 is connected in a "floating" manner to these brackets 254 by means of knee hinge supports 256. Hinge supports 256 permit vertical movement of the upper grill member 122 within the lid housing 108 so that, with the lid housing in its closed position, the upper grill member 122 automatically contacts at least one of several food items 258 supported on the lower grill member 120 regardless of the height of such food item. If desired, a suitable latch member (not illustrated) may be secured within the lid housing to hold the upper grill member in a vertically retracted position in the event that the food items are to be grilled only on their lower surfaces. With the lid housing 108 in its closed position, a left end portion of the base housing discharge plenum 160 (as viewed in FIG. 9) communicates with the lid housing transfer passage 242 via a small transfer duct 260 carried within the base housing adjacent its open upper end and aligned with the inlet opening 244 of the lid housing transfer passage 242.

The jet curtain plates 118 and 124 are similar in configuration and operation to those utilized in embodiments of the present invention previously described herein. The jet curtain plates have corrugated cross-sections defined by alternating, contiguous series of generally V-shaped parallel ridges which respectively project toward and away from the grill members 120, 122 when the lid housing 108 is in its closed position. A series of noncircularly cross-sectioned air slots 262 (preferably of a generally rectangular cross-section) are formed in apex regions of the plate ridges which face the grill members.

During operation of the grill 100, with the lid housing 108 in its closed position and the food items 258 being positioned between and contacted by the grill members 120 and 122, the rotating fan impeller 182 creates a forced, recirculating flow of heated cooking air 264 within the base and lid housings. Impeller 182 forces the air 264 through the base housing discharge plenum, a portion of the air 264 entering the base housing supply plenum 214 and the balance of the air being flowed into the lid housing supply plenum 240 via the transfer duct 260 and the lid housing transfer plenum 242. A major portion of the air entering the base housing supply plenum 214 strikes the underside of the baffle plate 216 and is diverted thereby horizontally into the supply plenum 214. The deflected air is then forced upwardly through the air slots 262 in the lower jet curtain plate 118 and impinges upon the lower grill member 120 and the food items 258. Air in the lid housing supply plenum 240 is simultaneously forced downwardly through the air slots 262 in the upper jet curtain plate 124 and impinges upon the upper grill member 122 and upper surface portions of the food items 258. Next, the air flows downwardly into the return plenum 150 and into the heating plenum 156 via the circular transfer opening 158 formed in the interior wall 146. Finally, the air is drawn through the heating chamber 156 across the heating elements 176, 178 and the heat sink plate 180 and into the fan impeller 182 through the transfer opening 162 formed in the interior wall 154. The heat sink plate 180 absorbs and stores heat from the heating elements 176, 178 and releases the stored heat to the air 264 in response to a temperature drop therein caused, for example, when cold food items are placed in the grill as various food batches are being sequentially cooked. This significantly reduces the cooking temperature "recovery" time and thus the total time required to cook each food batch.

As in the case of their counterparts in previously described embodiments of the present invention, the jet curtain plates 118, 124 function in a unique manner to provide for very rapid and even cooking of the stationary food items 258. In developing the present invention, it was discovered that the rectangular configuration of the jet curtain plate slots 262 provided for an inherently balanced distribution of the heated cooking air 264 across the length and width of the plates. More specifically, as compared to conventional circular openings in air distribution members, the rectangularly cross-sectioned air slots 262 are much less prone to provide unequal air flow through the various slots in a given plate. This inherent air flow balancing is further enhanced in the present invention by the generally V-shaped ridges in the jet curtain plates. These ridges uniquely function as balancing means for further facilitating the even distribution of air to the slots 262 across the length and width of both of the jet curtain plates. Accordingly, regardless of where the food items 258 are placed within the grill 100 they are subjected along their upper and lower surfaces to substantially equal flows of heated impingement air. The lower baffle plate 216 serves to diffuse the air 264 approaching the lower jet curtain plate 118 to even further enhance this very even distribution of air to the slots in the lower jet curtain plate.

The rectangularly cross-sectioned air slots 262 provide yet a further improvement in the cooking uniformity achieved in the grill 100. This is due to the fact that the rectangularly cross-sectioned jets of air discharged from the jet curtain plates begin to diffuse or "plume" slightly before they strike the food items 258. This plume effect causes the spaced apart jets to strike the food items in an overlapping pattern such that the entire upper and lower surfaces of the food items are completely covered with impinging heated air. Because of this unique overlapping impingement air pattern, the food items may be rapidly and evenly cooked within the grill 100 (as in the case of the other grill apparatus previously described herein) without the necessity of moving the food items relative to the air jets.

As is best illustrated in FIG. 10, the downwardly and forwardly sloping ridges on the lower jet curtain plate 118 define drainage troughs 266 interposed between the air slots 262 for receiving and draining away grease or other liquids falling from the food items 258. A suitable grease trough 268 is provided adjacent the forward side edge of the plate 118 to receive the liquid draining therefrom.

Illustrated in FIGS. 12 and 13 is an alternate embodiment 270 of the previously described grill 100 in which components similar to those in grill 100 have been given identical reference numerals with the subscript "a". Grill 270 is basically an open-topped version of the grill 100 and has a base housing $102_a$ which is substantially identical to the base housing 102 with the exception that the transfer duct 260 is deleted or suitably plugged, and the supporting legs 104 have been removed. Also deleted from the grill 270 is the lid housing 108 with its associated grill member 122 and jet curtain plate 124.

The base housing $102_a$ rests upon a suitable floor mounted support table 272 and has a vertically extending return duct 274 connected to the upper end of its return plenum $150_a$. The upper end of the return duct 274 is covered by an inner end portion of a hollow, internally insulated metal warming member 276 which extends forwardly from the return duct in a vertically spaced relationship with the upper end of the base housing $102_a$. From its juncture with the return duct 274, the undersurface 278 of the warming member 276 curves downwardly and forwardly as best illustrated in FIG. 12. Formed in a forward end portion of the warming member 276 is a warming cabinet chamber 280 that is provided at its front end with suitable doors 282 and is utilized to keep food items such as biscuits and the like warm while other food items 284 are being cooked on the lower grill member $120_a$ supported as previously described in the open upper end of the base housing $102_a$.

As heated cooking air 264 is upwardly discharged from the grill member $120_a$ across the food items 284, the air strikes the undersurface 278 of the warming member 276 and is drawn rearwardly along the surface 278 into a slotted return grill 286 mounted on the front surface of the return duct 274 near its juncture with the warming member 276. The air 264 is then flowed downwardly through the return duct 274 across a suitable washable filter 288 disposed therein and into the return plenum $150_a$. Filter 288 is provided with an access panel 289 mounted on the front surface of return duct 274.

The heated cooking air 264 flowing along the warming member undersurface 278, at a forward end portion thereof, functions to transfer a portion of the heat from the air into the warming cabinet 280 to warm the waiting food items therein. Because the heated cooking air 264 is maintained in a constant recirculating air pattern, it can be seen that no auxiliary exhaust hood or other exhaust apparatus is required in conjunction with the open-top air slot cooking grill 270. The internal air flow and components within the base housing $102_a$ are identical to those previously described in conjunction with the base housing 102 of the air slot grill 100.

Figure 14:
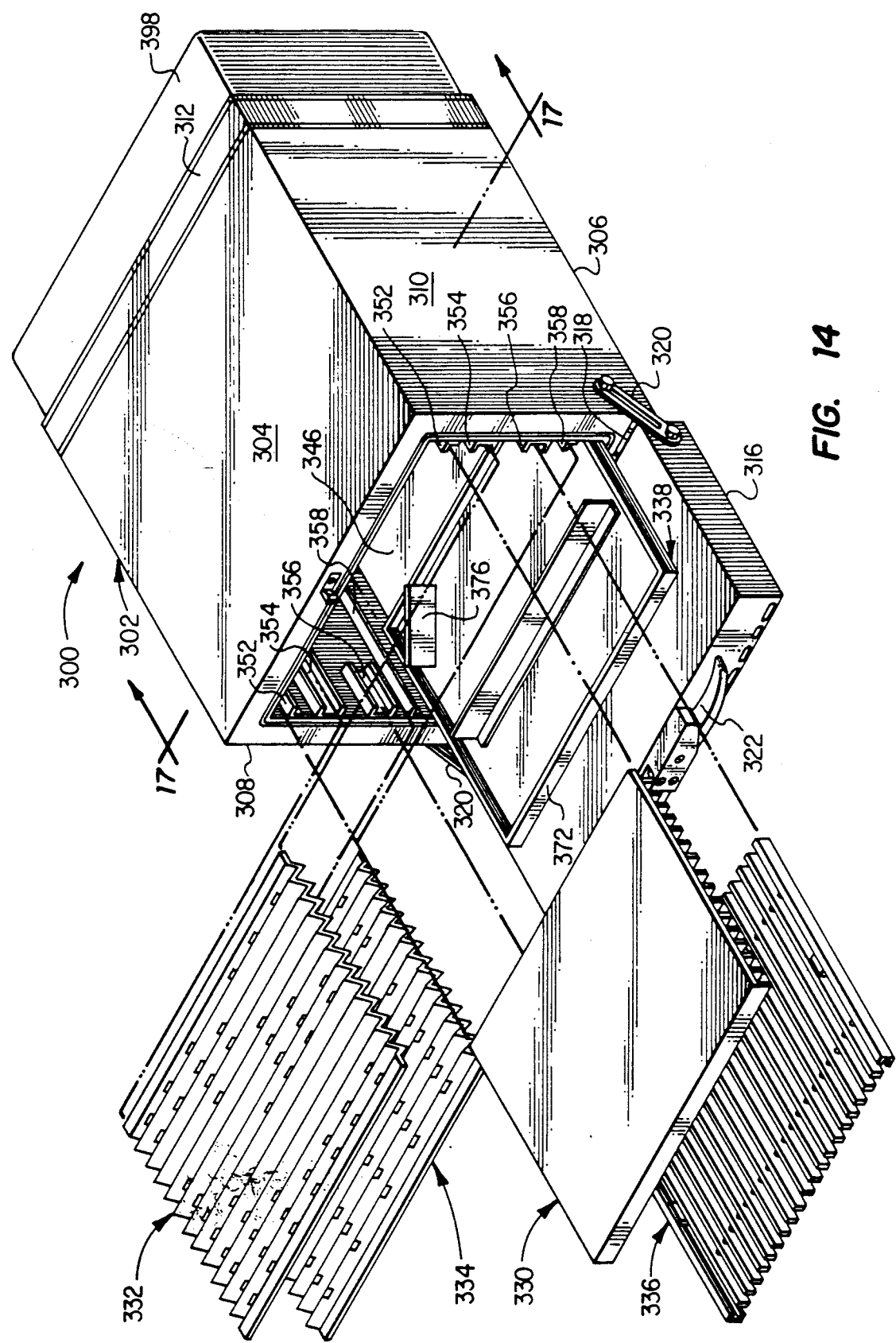
FIG. 14 is a partially exploded front perspective view of a countertop embodiment of the air slot cooking grill of the present invention.

Depicted in FIGS. 14-18 is a further embodiment 300 of the air slot cooking grill of the present invention which is particularly well adapted to commercial countertop cooking applications. Referring first to FIGS. 14 and 15, the grill 300 has a hollow metal housing 302 which has a rectangular cross-section and is formed from insulated hollow metal exterior walls (see also FIGS. 17 and 18) including an upper wall 304, a lower wall 306, left and right sidewalls 308 and 310, a rear wall 312 secured to the rear of the housing by means of suitable threaded fastening members 314, and a hollow, insulated metal door 316 which, in its closed position, defines a front wall of the housing 302. The door 316 is hinged, as at 318, at its lower side edge to the front of the housing 302 and is connected to the sidewalls 308, 310 by means of slotted support brackets 320 to support the door in its open position as illustrated in FIG. 14. Door 316 is also provided with a suitable latching handle 322 on its upper side edge, and a conventional convection air cooling passage 324 (FIG. 18) positioned inwardly of its forwardly disposed outer surface 326. During operation of the grill 300, ambient air 328 is drawn by convection upwardly through the passage 324 to cool the front door surface 326.

Disposed within the interior of the housing 300 in a manner subsequently described are a finned metal heat sink plate 330, upper and lower metal jet curtain plates 332 and 334, a metal grill or grate member 336, and a lower metal tray member 338. As illustrated in FIG. 14, each of these internal elements has a rectangular configuration, is readily accessible, and may be simply pulled outwardly through the open front end of the housing 302 for cleaning.

Figure 17:
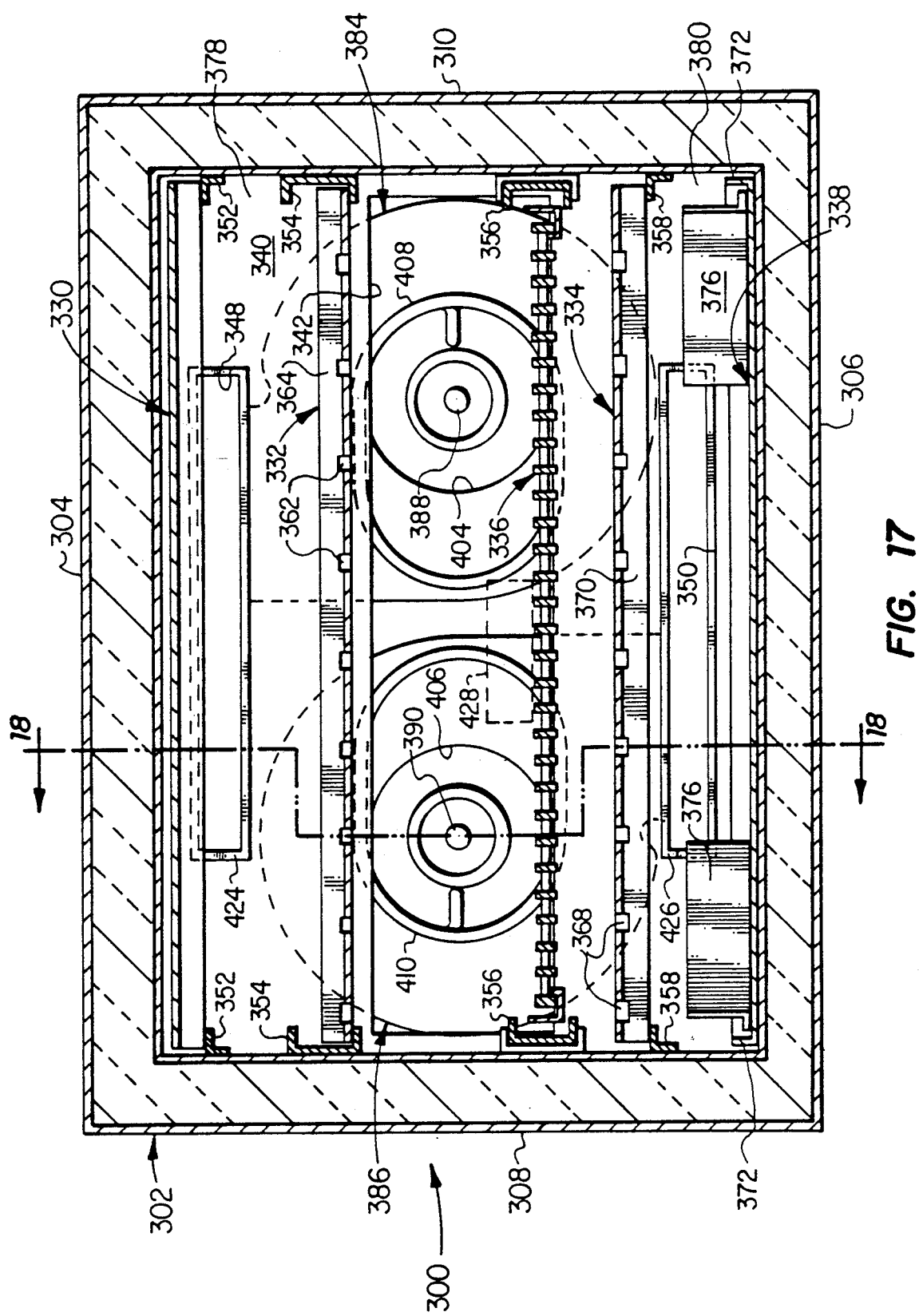
FIG. 17 is an enlarged scale cross-sectional view through the countertop grill taken along line 17—17 of FIG. 14.
Figure 18:
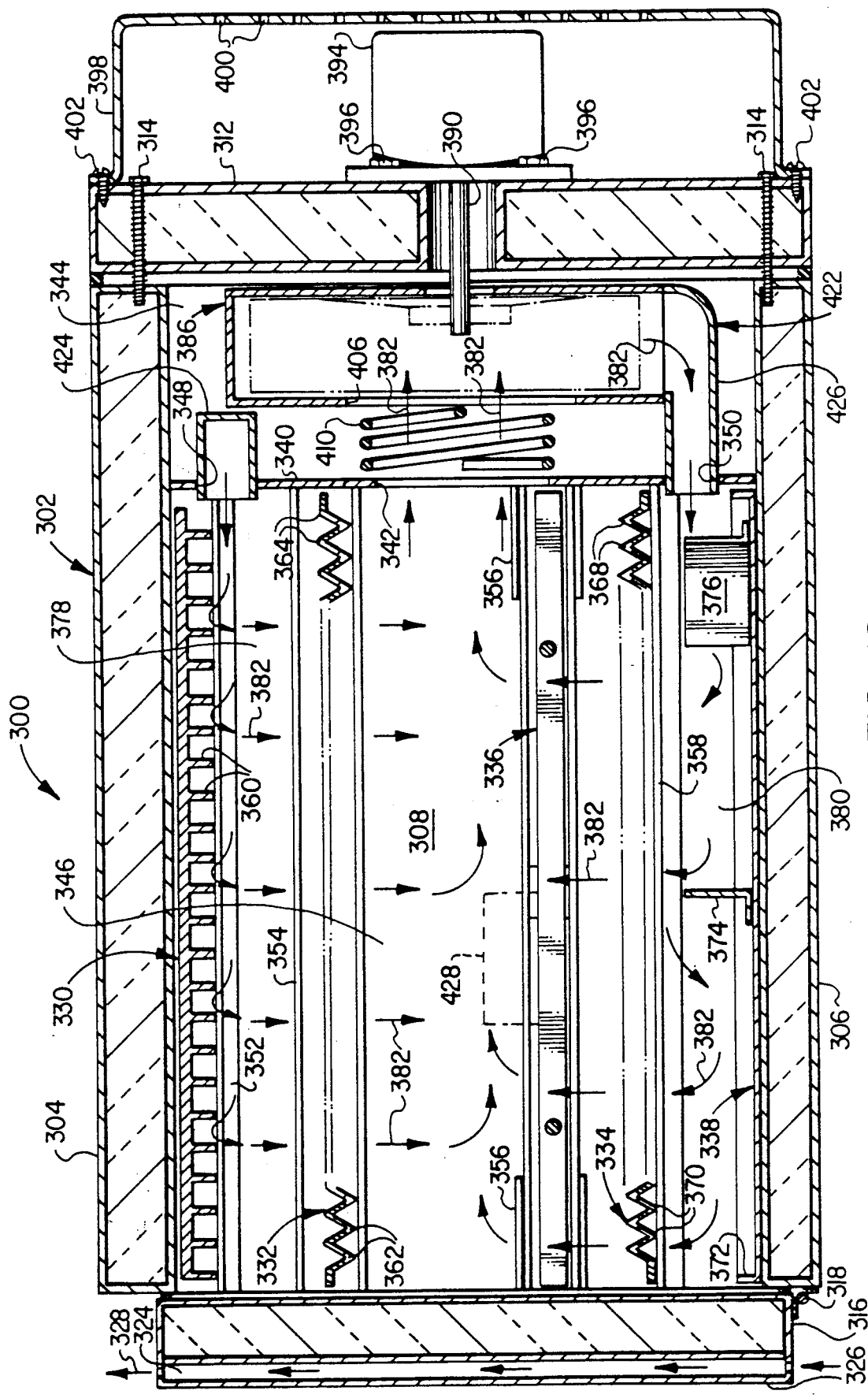
FIG. 18 is a cross-sectional view taken through the countertop grill along line 18—18 of FIG. 17.

Referring now to FIGS. 17 and 18, the interior of the housing 302 is provided with a vertically extending interior partition wall 340 having a rectangularly shaped, horizontally elongated return opening 342 formed through a vertically intermediate portion thereof. Interior wall 340 defines with the rear housing wall 312 a return chamber 344, and defines with the door 316 in its closed position an enclosed cooking chamber 346 which communicates with the return chamber 344 through the return opening 342. Also formed through the interior wall 340 are rectangular, horizontally elongated upper and lower supply openings 348 and 350 which are respectively positioned adjacent the upper and lower exterior housing walls 304 and 306.

The heat sink plate 330, the jet curtain plates 332 and 334, and the grill member 336 are slidably and removably supported within the cooking chamber 346 by suitable vertically aligned, horizontally extending bracket pairs 352, 354, 356 and 358 which are secured to the inner surfaces of the housing sidewalls 308 and 310. Brackets 352 have generally L-shaped cross-sections, are positioned slightly below the upper edge of the upper supply opening 348, and support opposite side edge portions of the heat sink plate 330 with the fins 360 thereon projecting downwardly and extending transversely to the housing sidewalls 308 and 310. Mounting brackets 354 have U-shaped cross-sections, are vertically positioned between the upper supply opening 348 and the return opening 342, and support opposite side edge portions of the upper jet curtain plate 332 with its rectangularly cross-sectioned air slots 362 facing downwardly and its corrugated ridges 364 extending transversely to the housing sidewalls 308 and 310. Brackets 356 have generally U-shaped cross-sections and support the grill member 336 vertically adjacent the lower edge of the return opening 342. Brackets 358 are positioned just above the upper edge of the lower supply opening 350 and support opposite edge portions of the lower jet curtain plate 334 with its rectangularly cross-sectioned air slots 368 facing upwardly and its corrugated ridges 370 extending parallel to those in the upper jet curtain plate. The lower tray member 338 rests upon the inner surface of the housing bottom wall 306 and has, around its rectangular periphery, an upturned flange 372. Suitably secured to a central portion of the tray member 338 is an upstanding central baffle member 374. Also secured to the tray member 338 adjacent its rear corners are a pair of angled, upstanding corner baffle members 376.

The upper jet curtain plate 332 defines the lower boundary of an upper supply plenum 378 disposed within the cooking chamber 346, while the lower jet curtain plate 334 defines the upper boundary of a lower supply plenum 380 also disposed within the cooking chamber 346. A forced, recirculating flow of heated air 382 (FIG. 18) is created within the housing 302 by means of a pair of centrifugal air supply fans 384 and 386 (FIGS. 15-17) which are disposed within the return chamber 344. Fans 384, 386 are respectively driven by the output shafts 388, 390 of electric motors 392, 394 which abut the outer surface of the housing rear wall 312. The motors and the supply fans are bolted together on opposite sides of the rear wall 312 as indicated in FIG. 18 by connecting bolts 396 which extend through the rear wall 312. The motors 392 and 394 are covered by a protective metal shroud 398 which has suitable ventilating slots 400 formed in the rearwardly facing surface thereof and is secured to the rear wall 312 by suitable threaded fasteners 402.

The fans 384 and 386, respectively, have circular inlet openings 404 and 406 which face and are rearwardly spaced apart from the return opening 342 as may best be seen in FIG. 18. The internal recirculating air 382 is heated by means of a pair of electric heating elements 408 and 410 disposed in the return chamber 344, each of such heating elements being interposed between one of the fan inlets 404, 406 and the return opening 342.

The fans 384 and 386, respectively, have discharge sections 412 and 414, the discharge 412 facing upwardly, and the discharge section 414 facing downwardly as illustrated in FIG. 15. Discharge sections 412 and 414 are respectively secured to the rearwardly extending leg portions 416 and 418 of generally L-shaped supply ducts which have open sided transverse leg portions 424 and 426. The supply duct legs 424 and 426 have, along their lengths, horizontally elongated rectangular cross-sections which are just slightly smaller than the upper and lower supply openings 348 and 350 formed in the interior housing wall 340. The supply ducts legs 424 and 426, respectively, are slidably and removably received in such supply openings 348 and 350 as best illustrated in FIG. 18.

This interconnection between the rear housing wall, the fan motors, the supply fans and the L-shaped supply ducts uniquely provides complete and very rapid removal from and access to all of these components from the grill 300. All that is required for such removal and access is to remove the motor shroud 398 and then remove the rear housing wall 312. The removal of the housing wall 312 simultaneously pulls the supply fans and the supply ducts connected thereto outwardly from the return chamber 344. This easy removal technique is, of course, substantially facilitated by the slidable connection of the supply ducts to the upper and lower supply openings 348 and 350. When the necessary repairs and/or cleaning of the removed elements has been completed, the rear housing wall 312 is simply resecured to the back end of the housing 302 to automatically and correctly reposition the supply fans within the return chamber and the supply duct legs 424 and 426 into the upper and lower supply openings 348 and 350.

During operation of the air slot grill 300, the supply fans 384 and 386 simultaneously force the heated air 382 from within the return chamber 344 into the upper and lower supply plenums 378 and 380 via the supply ducts 420 and 422. Heated air within the upper and lower supply plenums is forced vertically through the rectangular air slots 362 and 368 of the upper and lower jet curtain plates 332, 334 toward the grill member 336 and upper and lower surfaces of a representative food item 428 supported thereon. After the rectangularly cross-sectioned heated air jets plume and impinge upon the food item 428 the air 382 is drawn into the return chamber 344 through the return opening 342, flows across the electric heating elements 408 and 410 and is drawn into the inlet openings 404, 406 of the supply fans 384 and 386.

As previously discussed with regard to other air slot grill embodiments described herein, the upwardly projecting ridges on the upper jet curtain plate 332, and the downwardly projecting ridges on the lower jet curtain plate 334 function as balancing means to facilitate an even distribution of air from the upper and lower supply plenums 378 and 380 to their associated jet curtain plates. To further facilitate this even air distribution to the rectangularly cross-sectioned air slots in the upper and lower jet curtain plates, turbulence is created in the air 382 entering the upper and lower supply plenums via the supply ducts 420 and 422 by means of the heat sink plate 330 and the lower tray member 338. Specifically, as can be best seen in FIG. 18, the downwardly projecting heat sink plate fins 360 are interposed in the path of the heated air 382 discharged into the upper supply plenum 378. The interception by these fins of a portion of this incoming heated air creates a turbulence therein which tends to "spread" the air over the upper surface of the upper jet curtain plate 332. In a similar manner, the central baffle member 374 secured to the lower tray member 338 functions to intercept and cause turbulence in the air 382 being discharged into the lower supply plenum 380. A portion of such air is deflected rearwardly toward the corner baffle members 376 which function to guide at least a small portion of the rebounding air into the rear corners of the lower supply plenum to thereby provide suitable air distribution to the air slots 368 along corresponding rear corner portions of the lower jet curtain plate 334.

In addition to its turbulence-creating function, the heat sink plate 330 also functions, in a manner previously describe din conjunction with other air slot grills herein, to absorb and store heat from the air 382 and release the stored heat to the air when it experiences a temperature drop when, for example, cold food items are placed in the grill during sequential grilling of various food batches.

All of the above-described embodiments of the present invention are suitable for indoor use since they completely enclose the food being grilled and/or recirculate the heated cooking air.

It can be seen from the foregoing that the present invention provides, in the various embodiments thereof, a unique air slot cooking grill which eliminates or minimizes the problems, limitations and disadvantages typically associated with impingement air cooking devices of conventional construction —particularly those utilizing culminated, circular high velocity air jets. The novel air slot grills illustrated and described herein provided for the rapid, economical and very even cooking of a variety of food items in a manner which greatly enhances their flavor and significantly prolongs their commercial shelf life. Each of the previously described air slot grills may be formed from relatively simply and inexpensive components, yet provides a substantially improved cooking method for both domestic and commercial applications.

While preferred embodiments of the present invention have been shown and described, it will be understood by persons skilled in this art that various changes and modifications may be made therein without departing from the spirit and scope thereof as defined by the following claims.

What is claimed is:

1. An air slot cooking grill comprising:
   (a) an enclosure having a base, a plurality of side walls, and a removable top, said enclosure defining a chamber having an air flow opening an air passage opening;
   (b) a housing abutting one of said plurality of said walls of said enclosure, said housing communicating fluidly with said chamber through said air flow opening;
   (c) blower means disposed within said housing, said blower means circulating air and having air input means and air output means, said air input means being in fluid communication with said chamber through said air flow opening, said air output means being in fluid communication with said chamber through said air passage opening;
   (d) a grill having a high percentage of open area disposed within said enclosure, said grill dividing said chamber into an operating space and a heat supplying space, said air flow opening being located in said operating space and said air passage opening being located in said heat supplying space;
   (e) a heat supplying element disposed within said enclosure and located in said heat supplying space; and
   (f) a first jet curtain plate disposed within said enclosure and located between said grill and said heat supplying element, said first jet curtain plate having an array of air slot openings directing jets of air toward said grill, said first jet curtain plate having a series of alternating v-shaped corrugations defining troughs and inverted v-shaped corrugations defining crests, said air slot openings being disposed in said crests.

2. An air slot cooking grill according to claim 1, further comprising:
   (g) a heat transfer plate disposed within said enclosure and located between said heat supplying element and said first jet curtain plate, said heat transfer plate defining an air transfer passage adjacent one of said plurality of side walls of said enclosure.

3. An air slot cooking grill according to claim 1, wherein said air flow opening is adjusted by control means to regulate air flow through said air flow opening.

4. An air slot cooking grill according to claim 1, wherein said air output means of said blower is attached to a transfer connection, said transfer connection passing through said air passage opening into said heat supplying space.

5. An air slot cooking grill according to claim 1, wherein air is directed toward said grill through said air slot openings at a velocity of from 300 feet/minute to 4000 feet/minute.

6. An air slot cooking grill according to claim 1, wherein air is directed toward said grill through said air slot openings at a velocity of from 300 feet/minute to 1700 feet/minute.

7. An air slot cooking grill according to claim 1, wherein said heat supplying element heats said circulating air to from 300° F. to 500° F.

8. An air slot cooking grill according to claim 1, wherein said heat supplying element heats said circulating air to from 400° F. to 500° F.

9. An air slot cooking grill according to claim 5, wherein said heat supplying element heats said circulating air to from 300° F. to 500° F.

10. An air slot cooking grill according to claim 1, wherein a first end of said first jet curtain plate is elevated with respect to a second end of said first jet curtain plate.

11. An air slot cooking grill according to claim 1, further comprising a dam member disposed on said enclosure base and defining a fluid collecting area in said heat supplying space, wherein said heat supplying element does not extend into said collecting area and fluid dripping from said second end of said first jet curtain plate drips into said collecting area.

12. An air slot cooking grill according to claim 1, wherein said removable top comprises an access cover openable into said operating space.

13. An air slot cooking grill according to claim 12, wherein said access cover is attached to said housing by hinge means.

14. An air slot cooking grill according to claim 12, wherein said access cover further comprises handle means.

15. An air slot cooking grill according to claim 1, where said enclosure is insulated to prevent heat loss.

16. An air slot cooking grill comprising:
   an enclosure having a base, a plurality of side walls, and a removable top, said enclosure defining a chamber having an air flow opening and an air passage opening;

a housing abutting one of said plurality of side walls of said enclosure, said housing communicating fluidly with said chamber through said air flow opening;

blower means disposed within said housing, said blower means circulating air and having air input means and air output means, said air input means being in fluid communication with said chamber through said air flow opening, said air output means being in fluid communication with said chamber through said air passage opening;

a grill having a high percentage of open area disposed within said enclosure, said grill dividing said chamber into an operating space and a heat supplying space, said air flow opening being located in said operating space and said air passage opening being located in said heat supplying space;

a heat supplying element disposed within said enclosure and located in said heat supplying space;

a first jet curtain plate disposed within said enclosure and located between said grill and said heat supplying element, said first jet curtain plate having an array of air slot openings directing jets of air toward said grill; and a second jet curtain plate disposed within said enclosure and located between said first jet curtain plate and said grill, said second jet curtain plate having an array of air slot openings directing jets of air toward said grill, said second jet curtain plate being spaced from said first jet curtain plate by a plurality of supports, said first and second jet curtain plates having a series of alternating v-shaped corrugations defining troughs and inverted v-shaped corrugations defining crests, said air slot openings of said first and second jet curtain plates being disposed in said crests.

17. An air slot cooking grill according to claim 16, wherein said crests of said second jet curtain plate are located above said troughs of said first jet curtain plate.

18. An air slot cooking grill according to claim 17, wherein said air slot openings of said second jet curtain plate are offset longitudinally with respect to said air slot openings of said first jet curtain plate.

19. An air slot cooking grill according to claim 18, wherein a first end of said first jet curtain plate is elevated with respect to a second end of said first jet curtain plate and a corresponding first end of said second jet curtain plate is elevated with respect to a second end of said second jet curtain plate.

20. An air slot cooking grill comprising:

an enclosure having a base, a plurality of side walls, and a removable top, said enclosure defining a chamber having an air flow opening and an air passage opening;

a housing abutting one of said plurality of said walls of said enclosure, said housing communicating fluidly with said chamber through said air flow opening;

blower means disposed within said housing, said blower means circulating air and having air input means and air output means, said air input means being in fluid communication with said chamber through said air flow opening, said air output means being in fluid communication with said chamber through said air passage opening;

a grill having a high percentage of open area disposed within said enclosure, said grill dividing said chamber into an operating space and a heat supplying space, said air flow opening being located in said operating space and said air passage opening being located in said heat supplying space;

a heat supplying element disposed within said enclosure and located in said heat supplying space;

a first jet curtain plate disposed within said enclosure and located between said grill and said heat supplying element, said first jet curtain plate having an array of air slot openings directing jets of air toward said grill; and a second jet curtain plate disposed within said enclosure and located between said grill and said removable top, said second jet curtain plate having an array of air slot openings directing jets of air toward said grill.

21. An air slot cooking grill according to claim 20, wherein a first end of said first jet curtain plate, a first end of said second jet curtain plate and a first end of said grill are attached to one of said plurality of side walls of said enclosure, and wherein a wall member having a diverter at one end thereof is attached to a second end of said first jet curtain plate, a second end of said second jet curtain plate and a second end of said grill, said wall member defining an air column space between said wall member and one of said plurality of side walls of said enclosure, said air column space being in fluid communication with said air transfer passage and said second jet curtain plate.

22. An air slot cooking grill according to claim 20, further comprising a grid disposed within said enclosure and located between said second jet curtain plate and said grill, said grid being flexibly attached to said second jet curtain plate and being spaced apart from said plurality of side walls of said enclosure.

23. An air slot cooking grill according to claim 22, wherein said removable top comprises an access cover openable into said operating space, said second jet curtain plate being attached to said access cover.

24. An air slot cooking grill according to claim 20, further comprising at least one chimney adjacent one of said plurality of side walls of said enclosure, said at least one chimney being in fluid communication with said air transfer passage and said second jet curtain plate.

25. An air slot cooking grill comprising:

(a) a sunken area having a base and a plurality of side walls;

(b) an access cover, said access cover being openable into said sunken area and sealingly contacting said plurality of side walls of said sunken area, said sunken area and said access cover defining a chamber having an air flow opening and an air passage opening;

(c) a housing abutting said access cover at said first side wall of said sunken area, said housing communicating fluidly with said chamber through said air flow opening;

(d) blower means disposed within said housing, said blower means circulating air and having air input means and air output means, said air input means being in fluid communication with said chamber through said air flow opening, said air output means being in fluid communication with said chamber through said air passage opening;

(e) a grill having a high percentage of open area disposed within said chamber, said grill dividing said chamber into an operating space and a heat supplying space, said air flow opening being located in said operating space and said air passage opening being located in said heat supplying space;

(f) a heat supplying element disposed within said enclosure and located in said heat supplying space;

(g) a jet curtain plate disposed within said chamber and located between said grill and said heat supplying element, said jet curtain plate having an array of air slot openings directing air toward said grill;

(h) a grease collecting plate having a plurality of openings disposed within said chamber and located between said heat supplying element and said base of said sunken area.

26. An air slot cooking grill according to claim 25, wherein said air output means of said blower is attached to a transfer connection, said transfer connection passing through said air passage opening and extending below said jet curtain plate.

27. An air slot cooking grill according to claim 26, wherein a first end of said jet curtain plate is elevated with respect to a second end of said jet curtain plate.

28. An air slot cooking grill comprising:
first wall means for defining an enclosed cooking chamber;
grill means, disposed within said cooking chamber, for supporting a food item to be cooked;
heating means, disposed within said cooking chamber beneath said grill means, for generating heat within said cooking chamber;
second wall means, interposed between said grill means and said heating means, for defining:
a series of sloping drain troughs for receiving and draining away liquid falling from the food item to thereby shield said heating means from said liquid, and
a series of air slot openings interposed between and positioned above said sloping drain troughs; and
means for creating a recirculating air flow across said heating means, upwardly through said air slot openings against a food item supported on said grill means, and back across said heating means, whereby the food item may be evenly cooked without moving it within said cooking chamber.

29. The air slot cooking grill of claim 28 further comprising:
a generally horizontally extending heat transfer plate interposed between said heating means and said second wall means, said heat transfer plate having an edge portion which defines with said first wall means an air transfer passage intercommunicating portions of said cooking chamber disposed on opposite sides of said heat transfer plate.

30. The air slot cooking grill of claim 28 further comprising:
third wall means, interposed between said second wall means and said grill means, for defining:
a series of sloping drain troughs, positioned above and aligned with said air slot openings defined by said second wall means, for receiving and draining away liquid falling from the food item, and
a series of air slot openings, interposed between and positioned above said sloping drain troughs defined by said third wall means, for transferring air discharged from said slot openings of said second wall means to the food item.

31. The air slot grill of claim 28 further comprising:
means defining a series of air slot openings positioned above said grill means within said cooking chamber, and;
means for directing a portion of said recirculating air flow downwardly through said air slot openings positioned above said grill means.

32. A method of cooking a food item comprising the steps of:
supporting the food item in a fixed position within an enclosed cooking chamber;
positioning a heating element beneath the food item;
providing at least one jet curtain plate having a series of air slots formed therethrough and a series of drain troughs interposed between and laterally offset from said air slots;
interposing said at least one jet curtain plate between said heating element and the food item so that said air slots face the food item and said drain troughs are in a sloped orientation; and
forcing air sequentially across said heating element, through said air slots onto the food item and back across said heating element.

33. The method of claim 32 wherein:
said providing step is performed by providing first and second jet curtain plates each having a series of air slots formed therethrough and a series of drain troughs interposed between and laterally offset from said air slots; and
said interposing step includes relatively positioning said first and second jet curtain plates so that they are in a vertically spaced relationship with the air slots and drain troughs of one of said jet curtain plates being respectively aligned with the drain troughs and air slots of the other of said jet curtain plates.

34. The method of claim 32 further comprising the step of:
positioning a jet curtain plate having air slots formed therethrough above the food item within said cooking chamber, and wherein said step of forcing air includes:
forcing a portion of said air downwardly through the air slots in said last-mentioned jet curtain plate.

35. The method of claim 32 further comprising the steps of:
providing a heat transfer plate;
interposing said heat transfer plate between said heating element and said at least one jet curtain plate in a generally horizontal orientation so that an edge portion of said heat transfer plate partially defines an air transfer passage intercommunicating portions of said cooking chamber disposed on opposite sides of said heat transfer plate.

36. Impingement air heating and grilling apparatus for cooking food, comprising:
first wall means for defining a base housing having an upper end, and a lid housing supportable on said base housing and movable between closed and open positions to selectively cover and uncover said upper end of said base housing, said lid housing having an open lower end which, with said lid housing in its closed position faces said upper end of said base housing;
first grill means, carried by said base housing adjacent said upper end thereof, for supporting a food item to be cooked;

second wall means, carried within said base housing, for defining a series of air slot openings positioned beneath said first grill means;

second grill means, supported within said lid housing for movement therein toward and away from said lower end of said lid housing, for automatically contacting an upper surface portion of the food item, despite variations in its height, when said lid housing is in its closed position;

third wall means, carried within said lid housing, for defining a series of air slot openings positioned above said second grill means;

means for creating a recirculating flow of heated air within said first wall means which simultaneously flows through said air slot openings and onto said first and second grill means and upper and lower surface portions of the food item to thereby simultaneously heat and grill the food item on opposite sides thereof; and balancing means, extending along surfaces of said second and third wall means, for facilitating an even distribution of heated air to said air slot openings.

37. The apparatus of claim 36 further comprising:
heat sink means for absorbing and storing heat from the recirculating heated air, and releasing the stored heat in response to a temperature drop within said first wall means.

38. The apparatus of claim 37 wherein:
said heat sink means comprise a finned heat sink plate disposed within said base housing in the path of air being recirculated therethrough.

39. The apparatus of claim 36 wherein:
said balancing means comprise mutually spaced parallel ridges formed on each of said second and third wall means and projecting away from said first and second grill means, said air slot openings being positioned between adjacent pairs of said parallel ridges.

40. The apparatus of claim 39 wherein:
said second and third wall means each comprise a jet curtain plate having a corrugated cross-section.

41. The apparatus of claim 40 wherein:
the corrugations in each of said jet curtain plates are generally V-shaped.

42. The apparatus of claim 36 wherein:
said air slot openings have non-circular cross-sections.

43. The apparatus of claim 42 wherein:
said air slot openings have generally rectangular cross-sections.

44. Apparatus for utilizing heated air to simultaneously heat and grill a food item on opposite sides thereof, comprising:

a base housing having an upper end, a return plenum, a heating plenum communicating with said return plenum, a discharge plenum communicating with said heating plenum and having an open upper end, and a base supply plenum extending generally horizontally across and communicating with said open upper end of said discharge plenum adjacent said upper end of said base housing;

a lid housing operatively associated with said base housing and being movable between closed and open positions to respectively cover and uncover said upper end of said base housing, said lid housing having an open lower end and a lid supply plenum disposed above said open lower end;

cooperating means on said base and lid housings for defining a generally vertically extending transfer passage which intercommunicates said lid supply plenum and a portion of said discharge plenum when said lid housing is in its closed position;

a lower jet curtain plate carried by said base housing and defining an upper boundary of said base supply plenum, said lower jet curtain plate having a corrugated cross-section defined by alternating, contiguous series of parallel ridges which respectively project upwardly and downwardly, and a series of noncircularly cross-sectioned air slots formed through the upwardly projecting ridges;

a lower grill member, carried by said base housing above and generally parallel to said lower jet curtain plate, for supporting a food item to be cooked;

an upper jet curtain plate carried within said lid housing and defining a lower boundary of said lid supply plenum, said upper jet curtain plate having a corrugated cross-section defined by alternating, contiguous series of parallel ridges which respectively project upwardly and downwardly, and a series of noncircularly cross-sectioned air slots formed through the downwardly projecting ridges;

an upper grill member supported within said lid housing beneath said upper jet curtain plate for movement toward and away from the same in a manner such that when said lid housing is moved to its closed position said upper grill member will automatically contact an upper surface portion of the food item regardless of its height;

heat transfer means for transferring heat to air within said heating plenum; and means for flowing air sequentially from said discharge plenum into said base supply plenum, and into said lid supply plenum via said transfer passage, outwardly through said air slots toward said upper and lower grill members, into said return plenum, from said return plenum into said heating plenum, and through said heating plenum into said discharge plenum.

45. The apparatus of claim 44 further comprising:
heat sink means for absorbing and storing heat from the flowing air and transferring heat thereto in response to a drop in the temperature thereof.

46. The apparatus of claim 45 wherein:
said heat sink means comprise a finned metal heat sink plate disposed within said heating plenum.

47. The apparatus of claim 44 wherein:
said means for flowing air comprise a fan impeller rotatable disposed within said discharge plenum, motor means for rotating said fan impeller, and a vertically sloping lower wall of said discharge plenum which defines at one end thereof a scroll portion which partially circumscribes said fan impeller and is spaced outwardly from the periphery thereof.

48. The apparatus of claim 47 wherein:
said lower wall slopes upwardly from adjacent said scroll portion thereof toward said cooperating means.

49. The apparatus of claim 48 wherein:
said cooperating means comprise a generally vertically extending transfer duct carried by said base housing and having an open lower end communicating with said discharge plenum, and an open upper end positioned adjacent said upper end of said base housing, and a transfer plenum formed in said lid housing, said transfer plenum communicating with said lid supply plenum and having an inlet opening positioned adjacent said open lower end of said lid housing, said open upper end of said transfer duct and said inlet opening in said transfer plenum being generally aligned and in close proximity when said lid housing is in its closed position.

50. The apparatus of claim 44 wherein:

said cross-sections of said air slots are generally rectangular.

51. Impingement air heating apparatus for cooking food, comprising:

a housing;

a grill member carried by said housing for supporting a food item;

a jet curtain plate disposed within said housing in a generally parallel, laterally spaced relationship with said grill member, said jet curtain plate having a series of noncircularly cross-sectioned air slots extending laterally therethrough;

means for creating a forced recirculating flow of heated air which sequentially traverses an interior portion of said housing, flows through said air slots and then impinges upon the food item and said grill member, said noncircularly cross-sectioned air slots in said jet curtain plate being operative to form, from heated air flowed therethrough, a spaced series of relatively high velocity heated air impingement jets which laterally plume and overlap before striking the food item in a manner evenly blanketing side surfaces of the food item and grill member which face said jet curtain plate with heated cooking air which transfers heat thereto at an accelerated rate and evenly cooks the food item side surface without requiring any relative movement between the food item and said jet curtain plate; and ridge means formed on said jet curtain plate for facilitating a generally equal distribution of heated air to said air slots.

52. The apparatus of claim 51 wherein:

said jet curtain plate has a corrugated cross-section defined by alternating, contiguous series of parallel, generally V-shaped ridges which respectively project toward and away from said grill member;

said ridge means comprise the series of ridges which project away from said grill member; and said air slots are formed in apex regions of the series of ridges which project toward said grill member.

53. The apparatus of claim 52 wherein:

said jet curtain plate is positioned beneath said grill member and is sloped so that the ridges which project away from said grill member define drainage troughs for receiving and draining away liquid falling from the food item.

54. The apparatus of claim 51 wherein:

said jet curtain plate is a lower jet curtain plate disposed beneath said grill member;

said apparatus further comprises an upper jet curtain plate disposed within said housing above said grill member in a generally parallel, laterally spaced relationship therewith, said upper jet curtain plate being configured similarly to said lower jet curtain plate and having ridge means formed thereon for facilitating a generally equal distribution of heated air to the air slots therein; and said recirculating flow of heated air simultaneously flows through said air slots in said upper and lower jet curtain plates and then impinges upon upper and lower surface portions of the food item and said grill member.

55. The apparatus of claim 54 further comprising:

a second grill member, carried within said housing beneath said upper jet curtain plate, and adapted to contact an upper surface portion of the food item.

56. The apparatus of claim 51 further comprising:

means for imparting turbulence to air supplied to said air slots.

57. The apparatus of claim 56 wherein:

said means for imparting turbulence comprise a plate member disposed on the inlet side of said jet curtain plate in a generally parallel, spaced relationship therewith and having at lease one baffle member secured thereto and projecting therefrom toward said jet curtain plate.

58. The apparatus of claim 51 wherein:

said air slots have generally rectangular cross-sections.

59. Impingement air heating apparatus for cooking food, comprising:

a housing;

a grill member carried by said housing for supporting a food item;

a jet curtain plate disposed within said housing in a generally parallel, laterally spaced relationship with said grill member, said jet curtain plate having a series of noncircularly cross-sectioned air slots extending laterally therethrough;

means for creating a forced recirculating flow of heated air which sequentially traverses an interior portion of said housing, flows through said air slots and then impinges upon the food item and said grill member;

ridge means formed on said jet curtain plate for facilitating a generally equal distribution of heated air to said air slots; and means for imparting turbulence to air supplied to said air slots, said means for imparting turbulence comprising a heat sink member disposed on the inlet side of said jet curtain plate and adapted to absorb and store heat from the recirculating heated air.

60. The apparatus of claim 59 wherein:

said heat sink member is a heat sink plate spaced from said jet curtain plate in a generally parallel relationship therewith and having a series of fins thereon which project toward said jet curtain plate.

61. Impingement air cooking apparatus comprising:

a housing having a door defining a front wall of said housing, a rear wall, a vertically extending interior wall dividing the interior of said housing into a first chamber extending inwardly from said front wall and a second chamber extending inwardly from said rear wall, a transfer opening formed through a vertically intermediate portion of said interior wall, an upper supply opening formed through said interior wall above said transfer opening, and a lower supply opening formed through said interior wall below said transfer opening;

an upper jet curtain plate supported within said first chamber between said upper supply opening and said transfer opening, said upper jet curtain plate defining a lower boundary of an upper supply plenum disposed within said first chamber above said transfer opening;

a lower jet curtain plate supported within said first chamber between said lower supply opening and said transfer opening, said lower jet curtain plate defining an upper boundary of a lower supply plenum disposed within said first chamber below said transfer opening, said upper and lower jet curtain plates having corrugated cross-sections defined by alternating series of parallel ridges which respectively project upwardly and downwardly, said upper jet curtain plate having a series of noncircularly cross-sectioned air slots formed through its downwardly projecting ridges, and said lower jet curtain plate having a series of noncircularly cross-sectioned air slots formed through its upwardly projecting ridges;

a grill member, carried within said first chamber between said upper and lower jet curtain plates, for supporting a food item to be cooked;

means for creating a recirculating flow of heated air within said housing which sequentially flows from said second chamber into said upper and lower supply plenums through said upper and lower supply openings, vertically through said air slot openings toward opposite sides of said grill member, and then rearwardly through said transfer opening into said second chamber, said noncircularly cross-sectioned air slots in said upper and lower jet curtain plates being operative to form, from heated air flowed therethrough, spaced series of relatively high velocity heated air impingement jets which laterally plume and overlap before striking the food item in a manner evenly blanketing opposite side surfaces of the food item and grill member with heated cooking air which transfers heat to the food item and grill member in an accelerated rate and evenly cooks the food item without requiring any relative movement between the food item and said upper and lower jet curtain plates; and means, disposed in said upper and lower supply plenums, for imparting turbulence to air entering said upper and lower supply plenums.

62. The apparatus of claim 61 wherein:
said air slots in said upper and lower jet curtain plates have generally rectangular cross-sections.

63. The apparatus of claim 62 wherein:
said ridges on said upper and lower jet curtain plates are generally V-shaped.

64. The apparatus of claim 61 wherein:
said means for creating a recirculating flow of heated air comprise first and second supply fans disposed within said second chamber and each having an inlet and an outlet, first and second supply ducts respectively interconnecting the outlets of said first and second supply fans to said upper and lower supply openings in said interior wall, first and second heating elements disposed within said second chamber adjacent said inlets of said first and second supply fans, respectively, and motor means for operating said first and second supply fans.

65. The apparatus of claim 61 wherein:
said means for imparting turbulence comprise a generally horizontally extending plate member positioned within one of said upper and lower supply plenums and having at least one baffle portion projecting toward said grill member.

66. The apparatus of claim 65 wherein:
said plate member is disposed within said lower supply plenum.

67. Impingement air cooking apparatus comprising:
a housing having a door defining a front wall of said housing, a rear wall, a vertically extending interior wall dividing the interior of said housing into a first chamber extending inwardly from said front wall and a second chamber extending inwardly from said rear wall, a transfer opening formed through a vertically intermediate portion of said interior wall, an upper supply opening formed through said interior wall above said transfer opening, and a lower supply opening formed through said interior wall below said transfer opening;

an upper jet curtain plate supported within said first chamber between said upper supply opening and said transfer opening, said upper jet curtain plate defining a lower boundary of an upper supply plenum disposed within said first chamber above said transfer opening;

a lower jet curtain plate supported within said first chamber between said lower supply opening and said transfer opening, said lower jet curtain plate defining an upper boundary of a lower supply plenum disposed within said first chamber below said transfer opening, said upper and lower jet curtain plates having corrugated cross-sections defined by alternating series of parallel ridges which respectively project upwardly and downwardly, said upper jet curtain plate having a series of noncircularly cross-sectioned air slots formed through its downwardly projecting ridges, and said lower jet curtain plate having a series of noncircularly cross-sectioned air slots formed through its upwardly projecting ridges;

a grill member, carried within said first chamber between said upper and lower jet curtain plates, for supporting a food item to be cooked;

means for creating a recirculating flow of heated air within said housing which sequentially flows from said second chamber into said upper and lower supply plenums through said upper and lower supply openings, vertically through said air slot openings toward opposite sides of said grill member, and then rearwardly through said transfer opening into said second chamber, said means for creating a recirculating flow of heated air comprising first and second supply fans disposed within said second chamber and each having an inlet and an outlet, first and second supply ducts respectively interconnecting the outlets of said first and second supply fans to said upper and lower supply openings in said interior wall, first and second heating elements disposed within said second chamber adjacent said inlets of said first and second supply fans, respectively, and motor means for operating said first and second supply fans, said rear wall being removably connected to the balance of said housing, said first and second supply fans being secured to said rear wall, and said first and second supply ducts being secured to said first and second supply fans and slidably received in said upper and lower supply openings, respectively; and means, disposed in said upper and lower supply plenums, for imparting turbulence to air entering said upper and lower supply plenums.

68. Impingement air cooking apparatus comprising:

a housing having a door defining a front wall of said housing, a rear wall, a vertically extending interior wall dividing the interior of said housing into a first chamber extending inwardly from said front wall and a second chamber extending inwardly from said rear wall, a transfer opening formed through a vertically intermediate portion of said interior wall, an upper supply opening formed through said interior wall above said transfer opening, and a lower supply opening formed through said interior wall below said transfer opening;

an upper jet curtain plate supported within said first chamber between said upper supply opening and said transfer opening, said upper jet curtain plate defining a lower boundary of an upper supply plenum disposed within said first chamber above said transfer opening;

a lower jet curtain plate supported within said first chamber between said lower supply opening and said transfer opening, said lower jet curtain plate defining an upper boundary of a lower supply plenum disposed within said first chamber below said transfer opening, said upper and lower jet curtain plates having corrugated cross-sections defined by alternating series of parallel ridges which respectively project upwardly and downwardly, said upper jet curtain plate having a series of noncircularly cross-sectioned air slots formed through it downwardly projecting ridges, and said lower jet curtain plate having a series of noncircularly cross-sectioned air slots formed through its upwardly projecting ridges;

a grill member, carried within said first chamber between said upper and lower jet curtain plates, for supporting a food item to be cooked;

means for creating a recirculating flow of heated air within said housing which sequentially flows from said second chamber into said upper and lower supply plenums through said upper and lower supply openings, vertically through said air slot openings toward opposite sides of said grill member, and then rearwardly through said transfer opening into said second chamber; and means, disposed in said upper and lower supply plenums, for imparting turbulence to air entering said upper and lower supply plenums, said means for imparting turbulence comprising a generally horizontally extending heat sink plate disposed within said upper supply plenum and having a series of downwardly projecting heat transfer fins formed thereon.

69. The apparatus of claim 68 wherein:

said heat transfer fins are elongated, mutually spaced and parallel, and longitudinally extend in a direction generally transverse to the flow direction of air entering said upper supply plenum through said upper supply opening in said interior wall.

70. Impingement air heating apparatus for cooking food, comprising:

a housing having an open upper end;

a grill member, carried by said housing adjacent said open upper end thereof, for supporting a food item to be cooked;

a jet curtain plate disposed within said housing beneath said grill member in a spaced relationship therewith, said jet curtain plate having a series of noncircularly cross-sectioned air slots extending laterally therethrough;

a return plenum formed in said housing;

a warming member positioned above and in a spaced relationship with said grill member, said warming member having a warming chamber formed therein, and an undersurface which faces said grill member;

a return duct extending between said warming member and said return plenum, said return duct having a return opening formed therein adjacent said warming member;

means for creating a recirculating flow of heated cooking air which sequentially flows from said return plenum upwardly through said air slots and across said grill member, upwardly to said undersurface of said warming member to heat the interior of said warming chamber, along said undersurface and into said return opening of said return duct, and through said return duct into said return plenum; and balancing means formed on said jet curtain plate for facilitating a generally equal distribution of heated cooking air to said air slots therein.

71. The apparatus of claim 70 wherein:

said air slots have generally rectangular cross-sections.

72. The apparatus of claim 71 wherein:

said balancing means comprise ridges formed on said jet curtain plate and said air slots are formed between said ridges.

73. Impingement air heating apparatus for cooking food, comprising:

a housing;

support means, disposed within said housing, for supporting a food item to be cooked; and means for creating within said housing a recirculating flow of heated air, a portion of which is defined by a spaced series of generally parallel, relatively high velocity heated air impingement jets directed toward said support means and originating at a location spaced apart therefrom, said heated air impingement jets being caused to laterally plume and overlap prior to striking a food item supported on said support means to thereby evenly blanket a side surface portion of the supported food item facing the impingement jet origination location with heated cooking air in a manner evenly cooking the supported food item side surface portion without the necessity of creating relative movement between the supported food item and said means for creating, the impingement jets striking the supported food item with a velocity sufficient to substantially accelerate the transfer of heat from the cooking air to the food item.

74. The impingement air heating apparatus of claim 73 wherein:

said heated air impingement jets have noncircular cross-sections.

75. The impingement air heating apparatus of claim 74 wherein:

said heated air impingement jets have generally rectangular cross-sections.

76. The impingement air heating apparatus of claim 73 wherein said means for creating include:

a plate member having a spaced series of jet-forming openings, and means for flowing said portion of said recirculating flow of heated air through said openings to create said heated air impingement jets.

77. The impingement air heating apparatus of claim 76 wherein:
said jet-forming openings have noncircular cross-sections.

78. The impingement air heating apparatus of claim 77 wherein:
said jet-forming openings have generally rectangular cross-sections.

* * * * *

UNITED STATES PATENT AND TRADEMARK OFFICE
CERTIFICATE OF CORRECTION

PATENT NO. : 5,000,085
DATED : March 19, 1991
INVENTOR(S) : Virgil L. Archer

It is certified that error appears in the above-identified patent and that said Letters Patent is hereby corrected as shown below:

In the Abstract, line 10 (Spec. pg. 65, line 9), insert --slots-- after "air".

Col. 21, line 10, describe "din"should be --described in --.

Col. 21, line 29, "provided" should be --provide --.

Col. 21, line 47, line 11 , insert --and --. after "opening".

Col. 21, line 49  line 12 , "said" should be --side --.

Col. 33, line 30, line 24 , "it" should be --its--.

Signed and Sealed this

Thirteenth Day of July, 1993

Attest:

MICHAEL K. KIRK

Attesting Officer

Acting Commissioner of Patents and Trademarks